(12) United States Patent
Horiuchi

(10) Patent No.: US 7,298,402 B2
(45) Date of Patent: Nov. 20, 2007

(54) IMAGE-PICKUP APPARATUS WITH EXPANDED DYNAMIC RANGE CAPABILITIES

(75) Inventor: Kazuhito Horiuchi, Nagano (JP)

(73) Assignee: Olympus Corporation (JP)

( * ) Notice: Subject to any disclaimer, the term of this patent is extended or adjusted under 35 U.S.C. 154(b) by 908 days.

(21) Appl. No.: 10/045,530

(22) Filed: Oct. 23, 2001

(65) Prior Publication Data

US 2003/0095192 A1   May 22, 2003

(30) Foreign Application Priority Data

Oct. 26, 2000   (JP) .............................. 2000-326522
Jan. 26, 2001   (JP) .............................. 2001-019044

(51) Int. Cl.
   *H04N 5/235*   (2006.01)
   *H04N 3/14*    (2006.01)
   *H04N 5/335*   (2006.01)
   *H04N 5/238*   (2006.01)

(52) U.S. Cl. .................... 348/229.1; 348/296; 348/364

(58) Field of Classification Search ................ 348/296, 348/362, 229.1, 218.1, 217.1, 216.1, 297, 348/221.1, 364; 382/270, 168
   See application file for complete search history.

(56) References Cited

U.S. PATENT DOCUMENTS

| | | | | |
|---|---|---|---|---|
| 4,647,975 A | * | 3/1987 | Alston et al. | 348/222.1 |
| 5,194,960 A | * | 3/1993 | Ota | 348/362 |
| 5,745,175 A | * | 4/1998 | Anderson | 348/345 |
| 5,801,773 A | * | 9/1998 | Ikeda | 348/229.1 |
| 5,828,793 A | * | 10/1998 | Mann | 382/284 |
| 5,917,546 A | * | 6/1999 | Fukui | 348/296 |
| 5,929,908 A | * | 7/1999 | Takahashi et al. | 348/364 |
| 6,765,619 B1 | * | 7/2004 | Deng et al. | 348/362 |
| 6,833,864 B1 | * | 12/2004 | Ashida | 348/229.1 |
| 6,839,087 B1 | * | 1/2005 | Sato | 348/362 |
| 6,850,642 B1 | * | 2/2005 | Wang | 382/169 |
| 6,903,770 B1 | * | 6/2005 | Kobayashi et al. | 348/296 |
| 2002/0012064 A1 | * | 1/2002 | Yamaguchi | 348/362 |

FOREIGN PATENT DOCUMENTS

| | | |
|---|---|---|
| EP | 0387817 | 9/1990 |
| EP | 0930780 | 7/1999 |
| EP | 0982938 | 3/2000 |
| JP | 6-38092 | 2/1994 |
| JP | 7-298142 | 11/1995 |
| JP | 11-205661 | 7/1999 |

* cited by examiner

*Primary Examiner*—Ngoc-Yen Vu
*Assistant Examiner*—Gregory V Madden
(74) *Attorney, Agent, or Firm*—Ostrolenk, Faber, Gerb & Soffen, LLP

(57) ABSTRACT

The present invention provides an image-pickup apparatus such as a digital still camera. Herein, prior to actual photographing, pre-photographing is performed with a shutter speed set to a plurality of different values. A signal synthesizing circuit synthesizes the resultant image values to acquire information concerning a dynamic range required to photograph a photographic scene. A signal distribution arithmetic circuit produces a histogram using the acquired information. A signal distribution analyzing circuit analyzes the peak frequencies of the histogram. A shutter timing calculating circuit produces shutter timing signals optimal for actual photographing according to the result of the analysis. An image-pickup device or the like is driven in response to each of the produced shutter timing signals, whereby actual photographing is achieved.

19 Claims, 19 Drawing Sheets

DISTRIBUTION OF BRIGHTNESS LEVELS IN PHOTOGRAPHIC SCENE

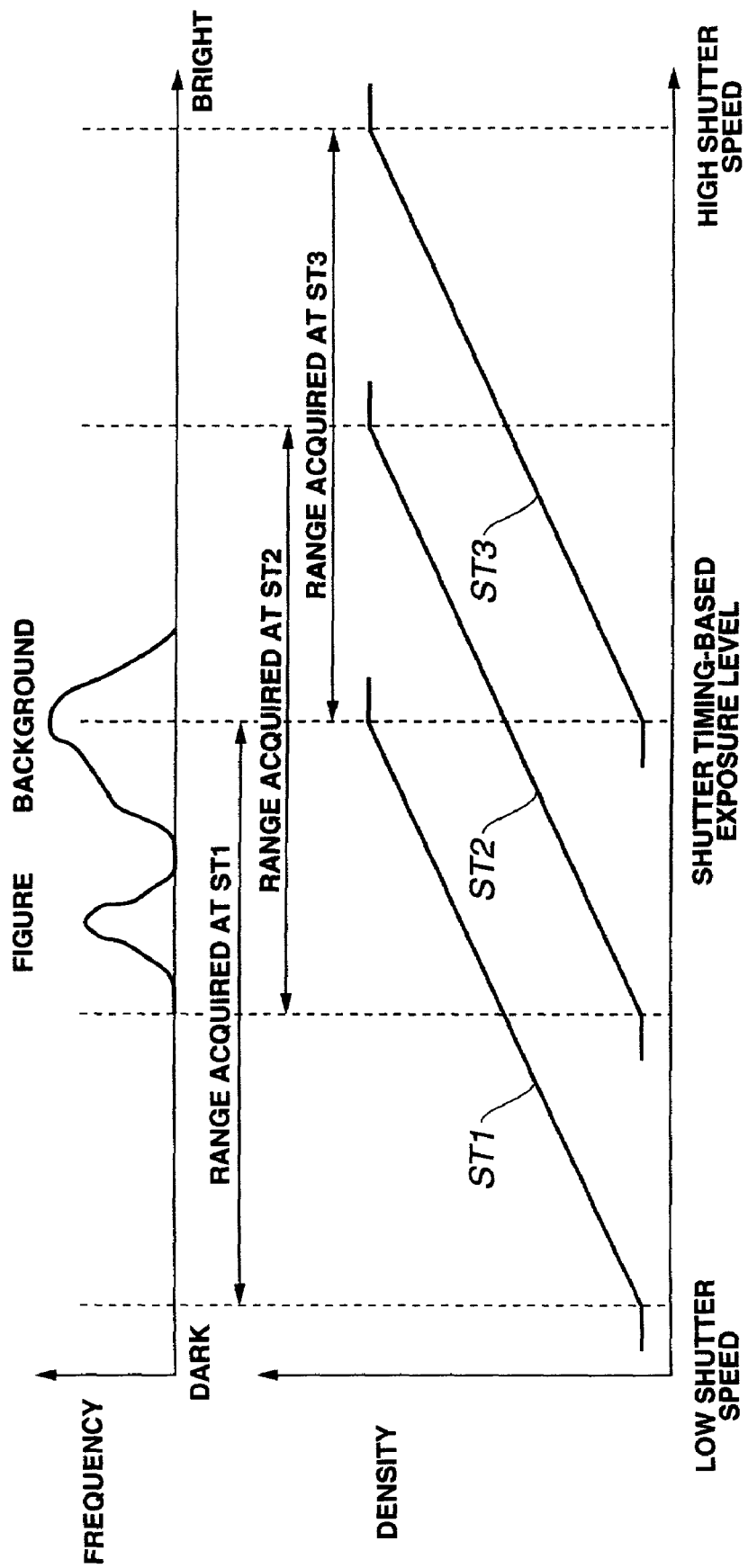

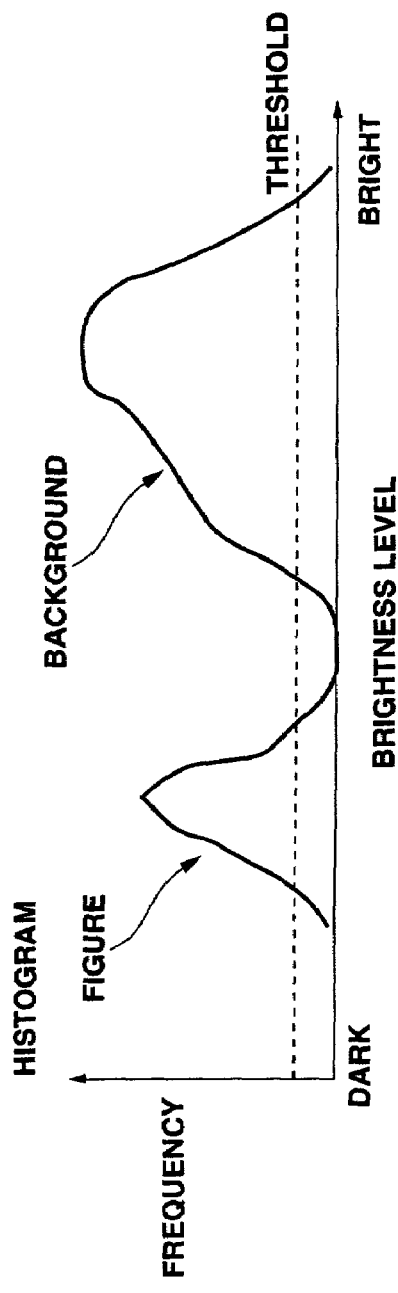
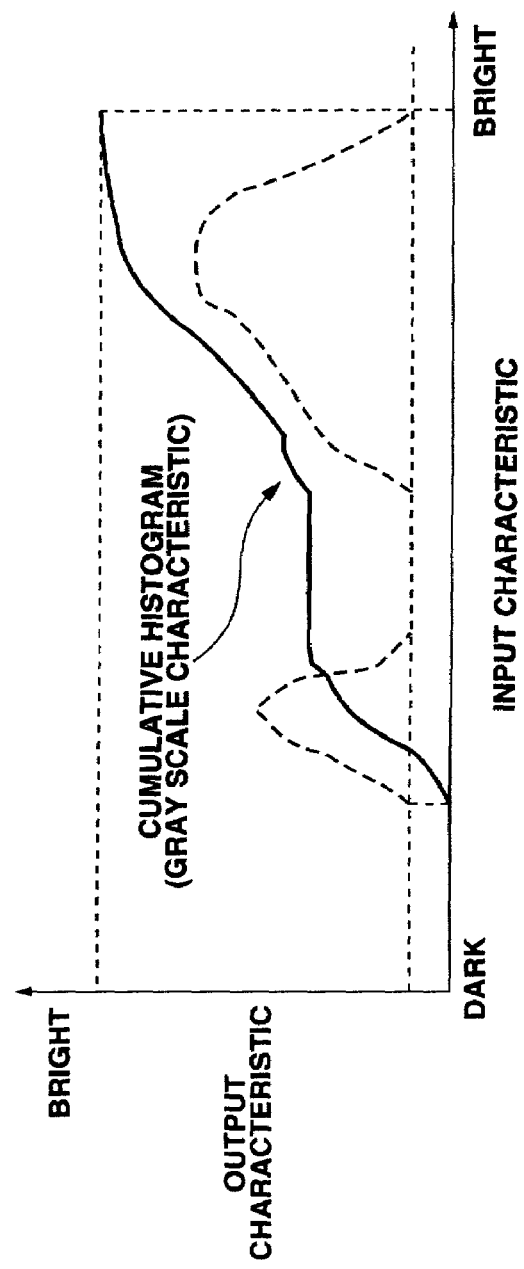
FIG.10A
FIG.10B

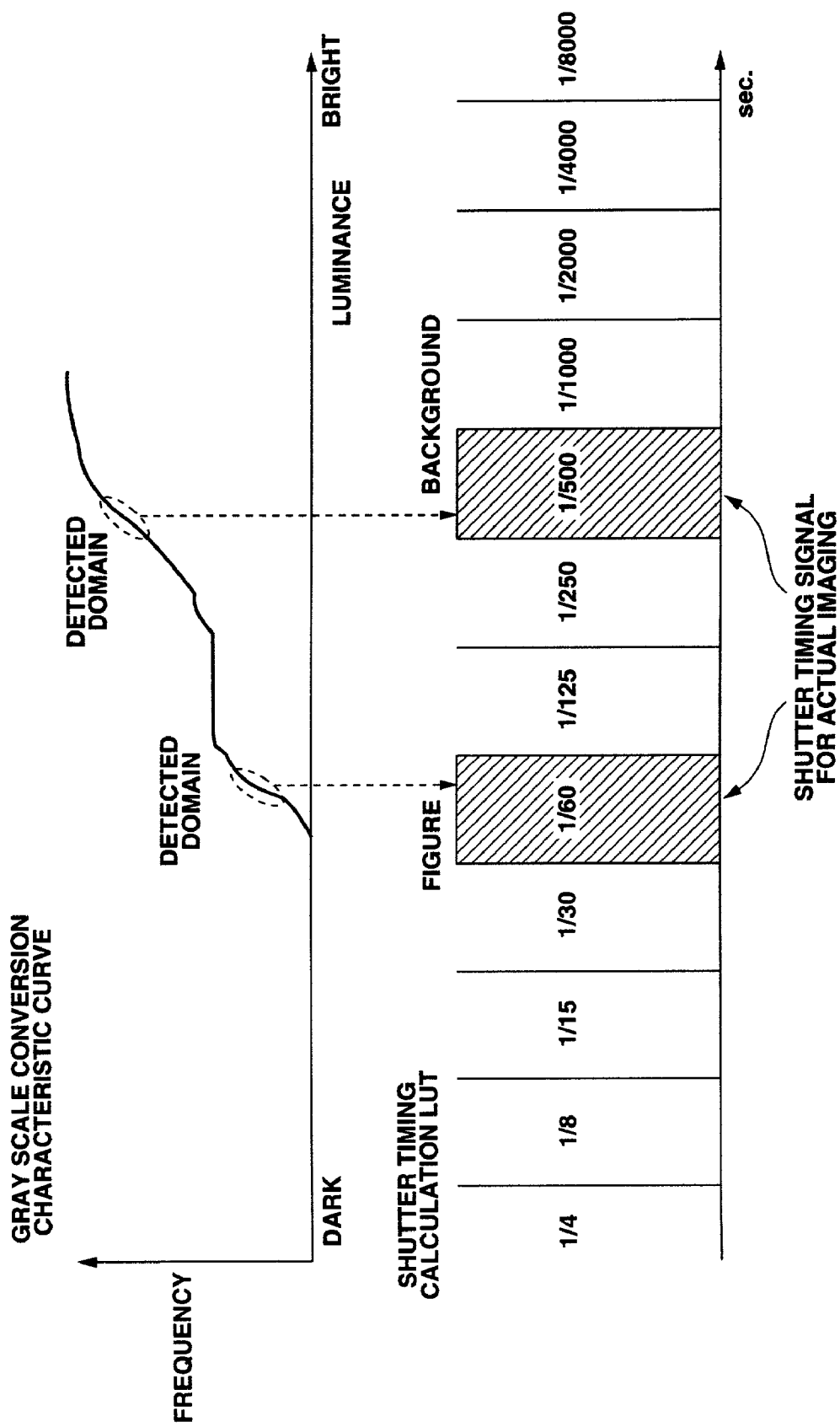

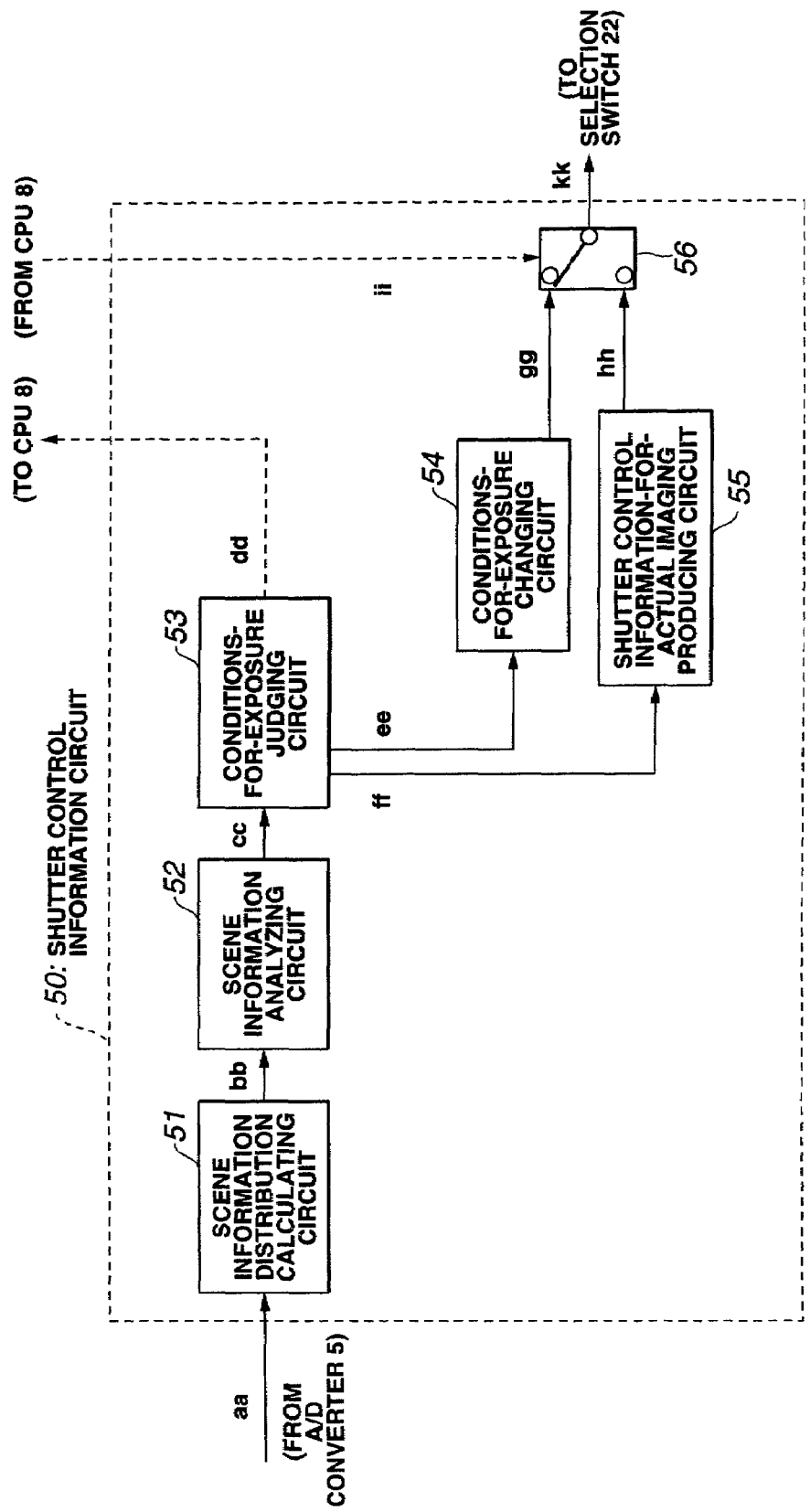

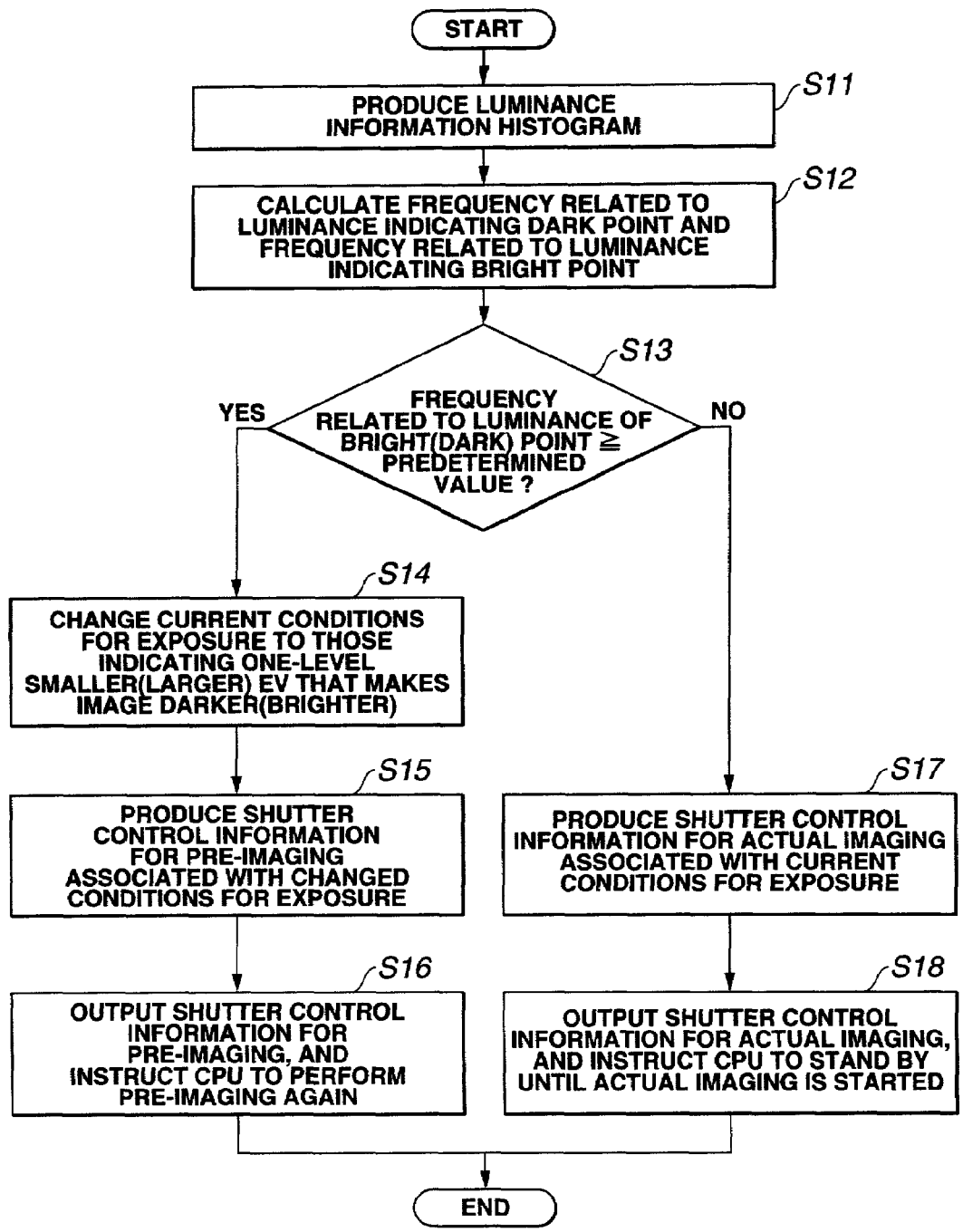

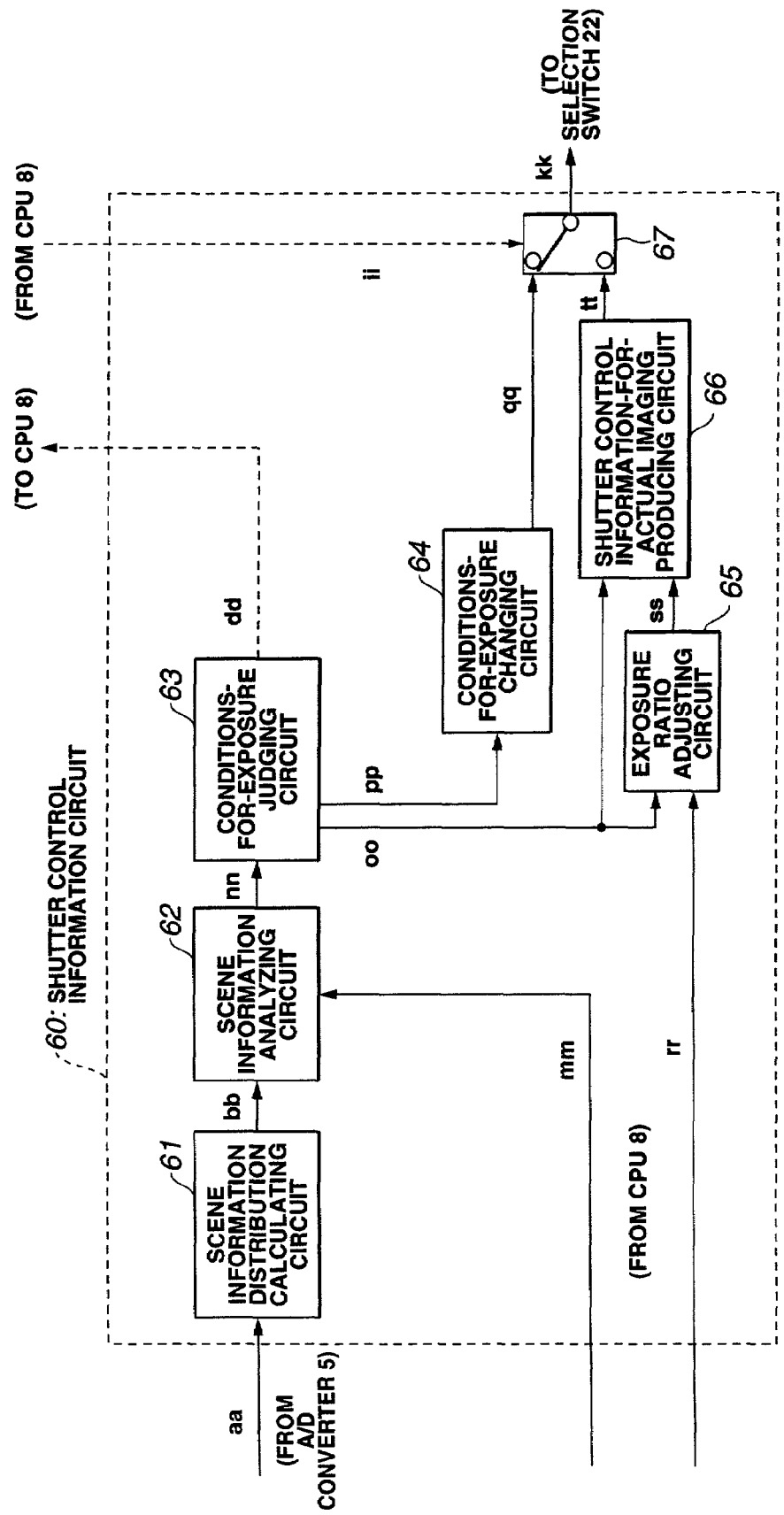

FIG.18

| | | | CONDITIONS FOR EXPOSURE FOR ACTUAL IMAGING (EXPOSURE TIME : UNIT SEC) | | | | | | | | | | | |
|---|---|---|---|---|---|---|---|---|---|---|---|---|---|---|
| | | MAJOR OBJECT | 1/8000 | 1/4000 | 1/2000 | 1/1000 | 1/500 | 1/250 | 1/125 | 1/60 | 1/30 | 1/15 | 1/8 | 1/4 |
| DIFFERENCE IN PHOTOMETRIC LEVEL (MAXIMUM VALUE - MINIMUM VALUE) (RATIO TO MAXIMUM VALUE IN PHOTOMETRIC RANGE) | 50% OR MORE | BRIGHT POINT | 16 | 16 | 16 | 16 | 16 | 16 | 16 | 16 | 8 | 4 | 2 | 1 |
| | | DARK POINT | 1 | 1/2 | 1/4 | 1/8 | 1/16 | 1/16 | 1/16 | 1/16 | 1/16 | 1/16 | 1/16 | 1/16 |
| | 25~50% | BRIGHT POINT | 8 | 8 | 8 | 8 | 8 | 8 | 8 | 8 | 8 | 4 | 2 | 1 |
| | | DARK POINT | 1 | 1/2 | 1/4 | 1/8 | 1/8 | 1/8 | 1/8 | 1/8 | 1/8 | 1/8 | 1/8 | 1/8 |
| | 10~25% | BRIGHT POINT | 4 | 4 | 4 | 4 | 4 | 4 | 4 | 4 | 4 | 4 | 2 | 1 |
| | | DARK POINT | 1 | 1/2 | 1/4 | 1/4 | 1/4 | 1/4 | 1/4 | 1/4 | 1/4 | 1/4 | 1/4 | 1/4 |
| | 5~10% | BRIGHT POINT | 2 | 2 | 2 | 2 | 2 | 2 | 2 | 2 | 2 | 2 | 2 | 1 |
| | | DARK POINT | 1 | 1/2 | 1/2 | 1/2 | 1/2 | 1/2 | 1/2 | 1/2 | 1/2 | 1/2 | 1/2 | 1/2 |
| | LESS THAN 5% | | 1 | 1 | 1 | 1 | 1 | 1 | 1 | 1 | 1 | 1 | 1 | 1 |
| F-NUMBER | 2.8 | BRIGHT POINT | 16 | 16 | 16 | 16 | 16 | 16 | 16 | 16 | 8 | 4 | 2 | 1 |
| | | DARK POINT | 1 | 1/2 | 1/4 | 1/8 | 1/16 | 1/16 | 1/16 | 1/16 | 1/16 | 1/16 | 1/16 | 1/16 |
| | 4.0 | BRIGHT POINT | 8 | 8 | 8 | 8 | 8 | 8 | 8 | 8 | 8 | 4 | 2 | 1 |
| | | DARK POINT | 1 | 1/2 | 1/4 | 1/8 | 1/8 | 1/8 | 1/8 | 1/8 | 1/8 | 1/8 | 1/8 | 1/8 |
| | 5.6 | BRIGHT POINT | 4 | 4 | 4 | 4 | 4 | 4 | 4 | 4 | 4 | 4 | 2 | 1 |
| | | DARK POINT | 1 | 1/2 | 1/4 | 1/4 | 1/4 | 1/4 | 1/4 | 1/4 | 1/4 | 1/4 | 1/4 | 1/4 |
| | 8.0 | BRIGHT POINT | 2 | 2 | 2 | 2 | 2 | 2 | 2 | 2 | 2 | 2 | 2 | 1 |
| | | DARK POINT | 1 | 1/2 | 1/2 | 1/2 | 1/2 | 1/2 | 1/2 | 1/2 | 1/2 | 1/2 | 1/2 | 1/2 |
| | 11.0 | | 1 | 1 | 1 | 1 | 1 | 1 | 1 | 1 | 1 | 1 | 1 | 1 |
| STROBE SETTING (USED OR NOT) | USED | BRIGHT POINT | 4 | 4 | 4 | 4 | 4 | 4 | 4 | 4 | 4 | 4 | 2 | 1 |
| | | DARK POINT | 1 | 1/2 | 1/4 | 1/4 | 1/4 | 1/4 | 1/4 | 1/4 | 1/4 | 1/4 | 1/4 | 1/4 |
| | NOT USED | BRIGHT POINT | 8 | 8 | 8 | 8 | 8 | 8 | 8 | 8 | 8 | 4 | 2 | 1 |
| | | DARK POINT | 1 | 1/2 | 1/4 | 1/8 | 1/8 | 1/8 | 1/8 | 1/8 | 1/8 | 1/8 | 1/8 | 1/8 |
| CONDITIONS FOR ACTUAL IMAGING | | BRIGHT POINT | 4 | 4 | 4 | 4 | 4 | 4 | 4 | 4 | 4 | 4 | 2 | 1 |
| | | DARK POINT | 1 | 1/2 | 1/4 | 1/8 | 1/8 | 1/8 | 1/8 | 1/8 | 1/8 | 1/8 | 1/8 | 1/8 |

IMAGE-PICKUP APPARATUS WITH EXPANDED DYNAMIC RANGE CAPABILITIES

This application claims benefit of Japanese Application No. 2000-326522 filed in Japan on Oct. 26, 2000, Japanese Application No. 2001-019044 filed in Japan on Jan. 26, 2001, the contents of which are incorporated by this reference.

BACKGROUND OF THE INVENTION

1. Field of the Invention

The present invention relates to an image-pickup apparatus, or more particularly, an image-pickup apparatus capable of substantially reproducing an image obtainable with a wide dynamic range.

2. Description of the Related Art

Various types of image-pickup apparatus for electrically producing an object image have been proposed in the past. In a digital still camera that is one type of image-pickup apparatus, a solid-state image-pickup device converts a light image, which is converged on a surface of the solid-state image-pickup device through a lens, into electric information and thus produces an image.

The solid-state image-pickup device incorporated in the digital still camera can produce many pixels at present and can therefore produce an image of a higher resolution. However, since the image-pickup device can offer only a very narrow dynamic range, a resultant image suffers from a narrow latitude (a range of reproduced brightness levels from a highlight to a shadow).

What is essential to reproduce an image despite the narrow dynamic range is an automatic exposure setting (AE) facility that properly determines a condition for exposure optimal to a photographic scene (exposure time (shutter speed) or an f-number). Some proposals have been made for a technology of reproducing an image using the AE facility in the past.

As an example of such a technology, Japanese Patent Unexamined Publication No. 6-38092 describes a technology concerning a video camera that can properly determine a condition for exposure and a photometry method employed in the camera. More particularly, according to the technology, when a value calculated by integrating luminance values that are specified in image information acquired for a photometric period within a horizontal scanning period is judged to fall within a predetermined range, photometry is performed based on the value. Furthermore, the patent unexamined publication describes that if the number of times by which the value calculated by integrating the luminance values is judged to fall outside the predetermined range exceeds a predetermined value, the condition for exposure is changed.

In order to acquire image information, which is obtainable with a wide dynamic range, from a solid-state image-pickup device suffering a narrow dynamic range, exposure is performed a plurality of times with an exposure level varied. This technology is well known.

The foregoing technologies will be described with reference to FIG. 19A, FIG. 19B, and FIG. 19C that show a photographic scene whose objects having a difference in luminance are exposed with an exposure level varied and which is thus exposed a plurality of times.

FIG. 19A shows a photographic scene having a figure, which is a dark major object, located nearly in the center of a background that is bright scenery. In order to pick up an image of the scenery using a solid-state image-pickup device that suffers a narrow dynamic range, exposure is performed with an exposure level lowered so that the background will appear more distinctly as shown in FIG. 19B. Moreover, exposure is performed with the exposure level raised so that the figure will appear more distinctly as shown in FIG. 19C. The background portion of the image shown in FIG. 19B and the figure portion of the image shown in FIG. 19C are combined in order to produce an image obtainable with a wide dynamic range. The image obtainable with a wide dynamic range shows both the background and figure distinctly.

Even when the foregoing technology of performing exposure a plurality of times is used to produce an image obtainable with a wide dynamic range, the AE facility plays a significant role in reproducing an optimal image. Specifically, when a scene which requires a wide dynamic range and in which a dark major object (figure) and a bright background coexist as shown in FIG. 19A, FIG. 19B, and FIG. 19C is imaged, the major object and background alike must be imaged while being exposed optimally.

Some technologies have been proposed for controlling photographing according to a photographic scene, which requires a wide dynamic range, so that both a major object and a background can be exposed optimally. For example, Japanese Patent Unexamined Publication No. 7-298142 describes an image-pickup apparatus that has a gray scale control facility. The gray scale control facility properly exposes both a major object and a background contained in a backlit photographic scene. To be more specific, the technology described in the patent unexamined publication requires a gray scale control means that switches timings, which set storing time of light information, according to whether a luminance value specified in image information indicates a high-luminance point or a low-luminance point.

Moreover, Japanese Patent Unexamined Publication No. 11-205661 describes a means that synthesizes a long-time exposure image produced under the predetermined condition for exposure, and a short-time exposure image produced while being exposed for a shorter exposure time. The means adjusts a ratio of exposure levels according to the position of a peak level point in a synthetic image.

However, according to the Japanese Patent Unexamined Publication No. 6-38092, if the number of times by which a value calculated by integrating luminance information falls outside a predetermined range exceeds a predetermined value, a condition for exposure is changed. Thereafter, photometry is performed in the same manner. As long as the scene shown in FIG. 19A, FIG. 19B, and FIG. 19C is concerned, after an initial condition for exposure is changed, it must be judged whichever of a bright point and a dark point should be subjected to photometry. Furthermore, according to the means, the condition for exposure under which either the bright point or dark point is imaged is optimized, and the condition for exposure under which the other point is imaged remains improper.

Moreover, according to the Japanese Patent Unexamined Publication No. 7-298142, in order to produce an image that enjoys excellent reproducibility, information concerning a photographic scene must be read from a solid-state image-pickup device or the like all the time. This results in an increase of power consumption. Furthermore, when photographing is performed a plurality of times with an exposure level varied, information of a bright point and information of a dark point must be read independently of each other. Based on the read information, control must be extended so that both the bright and dark points will be imaged properly all the time. This may lead to a larger amount of consumed power compared with an amount normally consumed power.

As a measure to be taken for lightening a load imposed on the AE facility, a means is conceivable. Namely, the AE facility is used to control exposure of either a major object or a background. The other of the controlled major object or background is exposed at a fixed exposure ratio. If an exposure ratio is thus fixed, the AE facility can be designed similarly to that adopted for a typical digital still camera.

However, a backlit state in which a major object and a background are distinguished from each other includes various cases. If brightness changes moderately between the major object and background, photographing may fail. Moreover, if a difference in brightness is as large as a difference in brightness between a dark indoor and a bright outdoor is, a scene may not be reproduced with an exposure ratio set to a value permissible for imaging of a normally backlit scene.

Furthermore, the condition for exposure under which one of bright and dark points is photographed may not be determined using the AE facility, and the condition for exposure under which the other point is photographed may not be determined using a fixed ratio. Instead, a means enabling a user to designate an exposure time and an exposure ratio is conceivable. However, a user may have difficulty in judging a proper exposure time or exposure ratio according to a difference in brightness. But for a certain experience or knowledge, it may be hard to judge what exposure time or exposure ratio is optimal. The means is therefore unpractical.

In addition, a means is conceivable for preparing a plurality of exposure settings in association with photographic scenes, and allowing a user to select any of the exposure settings. However, a user who does not have for a certain experience or knowledge may have difficulty in subjectively judging from a difference in brightness or the like what exposure setting is optimal for an actual photographic scene. The means cannot therefore be said to be practical.

According to the Japanese Patent Unexamined Publication No. 7-298142, when exposure is performed a plurality of times with an exposure level varied, a high-luminance point and a low-luminance point are specified manually in units of each of blocks into which an image field is divided. It is not clearly described how to automatically identify the high-luminance point and low-luminance point. Besides, how to identify the high-luminance point and low-luminance point after photographic scenes are changed is not clarified.

Moreover, according to the Japanese Patent Unexamined Publication No. 11-205661, the long exposure-time image and short exposure-time image are produced under the predetermined condition for exposure. If the levels of a signal representing an object do not fall within the range from the level of the signal representing the long exposure-time image to the level of the signal representing the short exposure-time image, an incorrect peak level may be detected. This poses a problem in that the ratio of exposure levels is not calculated properly.

SUMMARY OF THE INVENTION

Accordingly, an object of the present invention is to provide an image-pickup apparatus capable of properly photographing even a photographic scene, which exhibits a large difference in brightness and contains an object that exhibits a brightness range comparable to an arbitrary dynamic range, without the necessity of driving an AE facility all the time. The image-pickup apparatus can thus reproduce an image that requires a wide dynamic range.

Another object of the present invention is to provide an image-pickup apparatus capable of automatically determining a condition for exposure optimal to a dynamic range comparable to a brightness range exhibited by a photographic scene. Consequently, the image-pickup apparatus can reproduce an image that exhibits a brightness range comparable to the dynamic range required by the photographic scene.

Briefly, according to the present invention, there is provided an image-pickup apparatus consisting mainly of an information acquiring means, an analyzing means, a conditions-for-photographing setting means, and a photographing means. The information acquiring means acquires information concerning a dynamic range, which is required to photograph a photographic scene, with a condition for exposure varied before performing actual photographing. The analyzing means analyzes the information acquired by the information acquiring means. The conditions-for-photographing setting means sets the conditions for actual photographing according to the result of the analysis performed by the analyzing means. The photographing means performs actual photographing under the actual photographing conditions set by the conditions-for-photographing setting means.

The above and other objects, features and advantages of the invention will become more clearly understood from the following description referring to the accompanying drawings.

BRIEF DESCRIPTION OF THE DRAWINGS

FIG. 5 is an explanatory diagram concerning operation to be performed for pre-photographing in the digital still camera of the first embodiment;

FIG. 10A is a diagram showing an example of the frequencies of brightness levels observed in the second embodiment;

FIG. 10B is a diagram showing a cumulative histogram of cumulative frequencies produced using frequencies that are expressed in the input histogram shown in FIG. 1A and are equal to or larger than a predetermined threshold;

FIG. 11 is an explanatory diagram concerning operation to be performed for producing shutter timing signals using a gray scale conversion characteristic curve;

FIG. 13 is a block diagram showing the detailed configuration of a shutter control information circuit employed in the third embodiment;

FIG. 14 is a flowchart describing processing to be performed by the shutter control information circuit employed in the third embodiment;

FIG. 16 is a block diagram showing the detailed configuration of a shutter control information circuit employed in a fourth embodiment of the present invention;

FIG. 18 shows an example of a lookup table which an exposure ratio adjusting circuit employed in the fourth embodiment references to obtain an exposure ratio ss.

DESCRIPTION OF THE PREFERRED EMBODIMENTS

Embodiments of the present invention will be described with reference to the drawings below.

Figure 1:
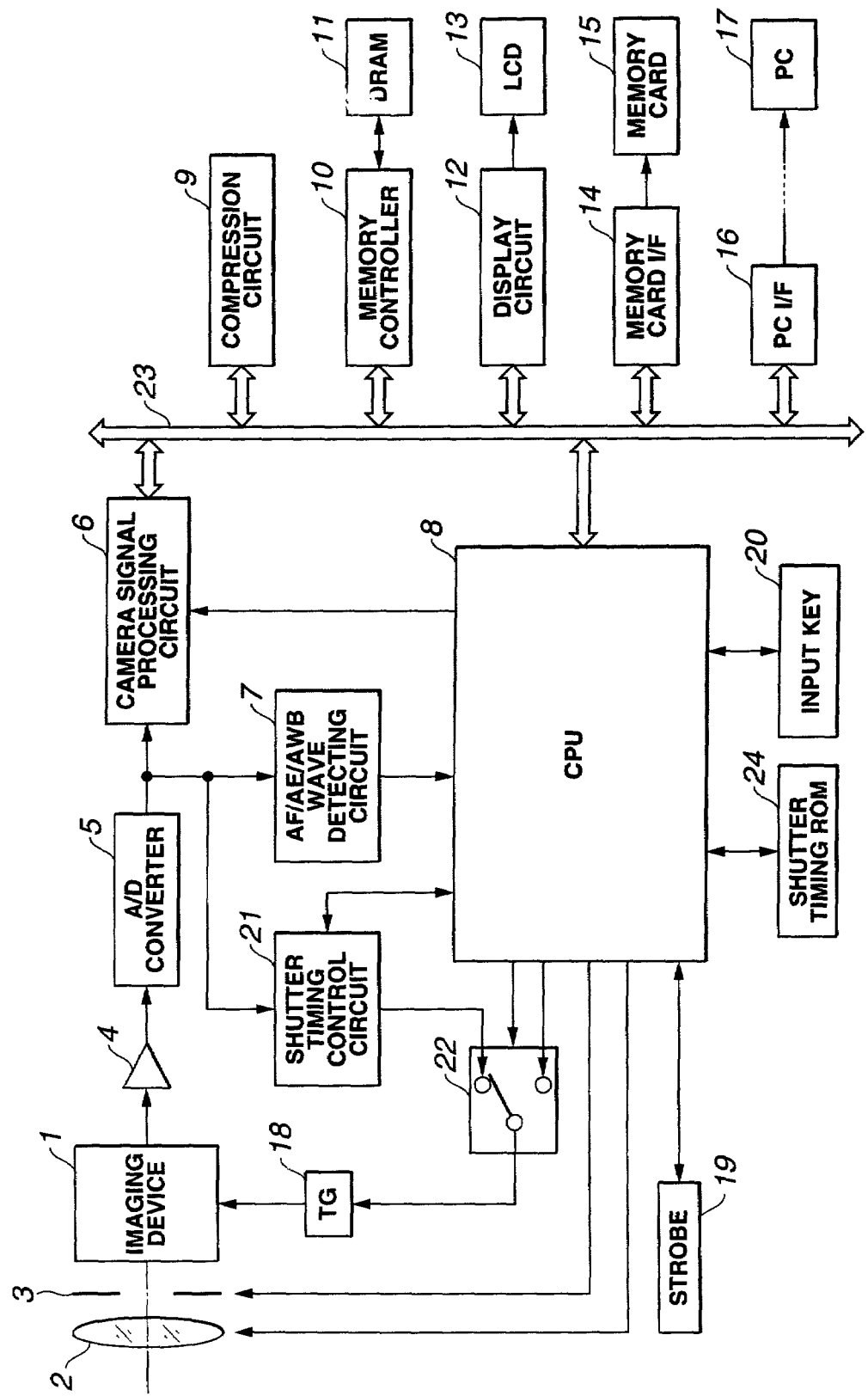
FIG. 1 is a block diagram showing the basic configuration of a digital still camera in accordance with a first embodiment of the present invention.
Figure 2:
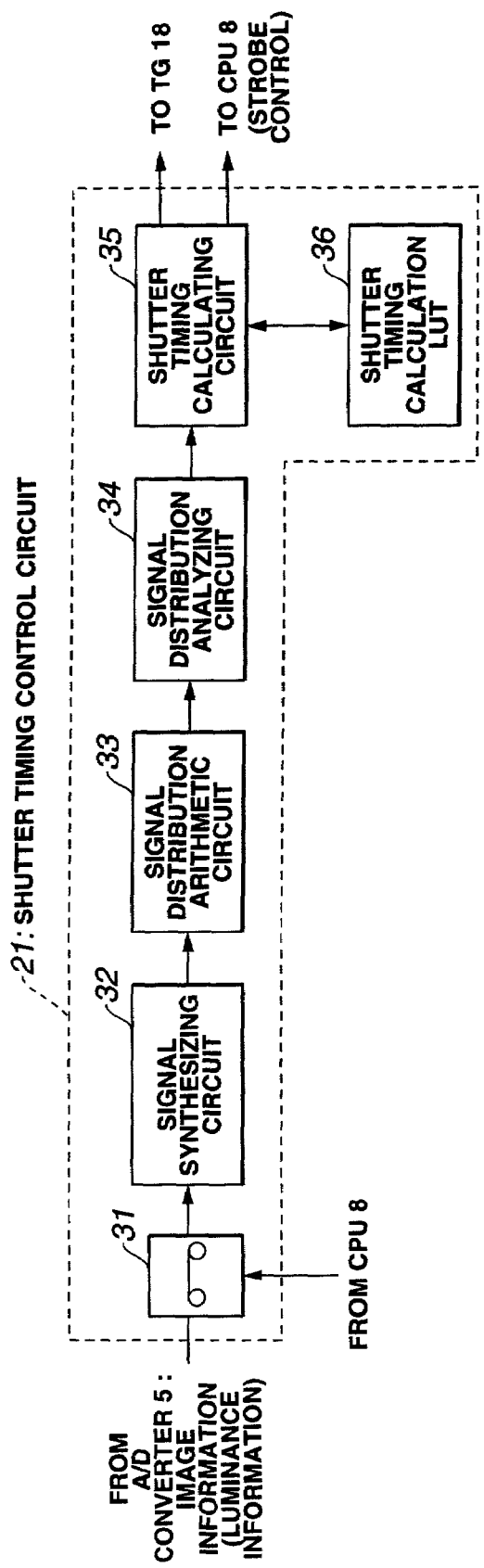
FIG. 2 is a block diagram showing an example of the configuration of a shutter timing control circuit shown in FIG. 1.
Figure 3:
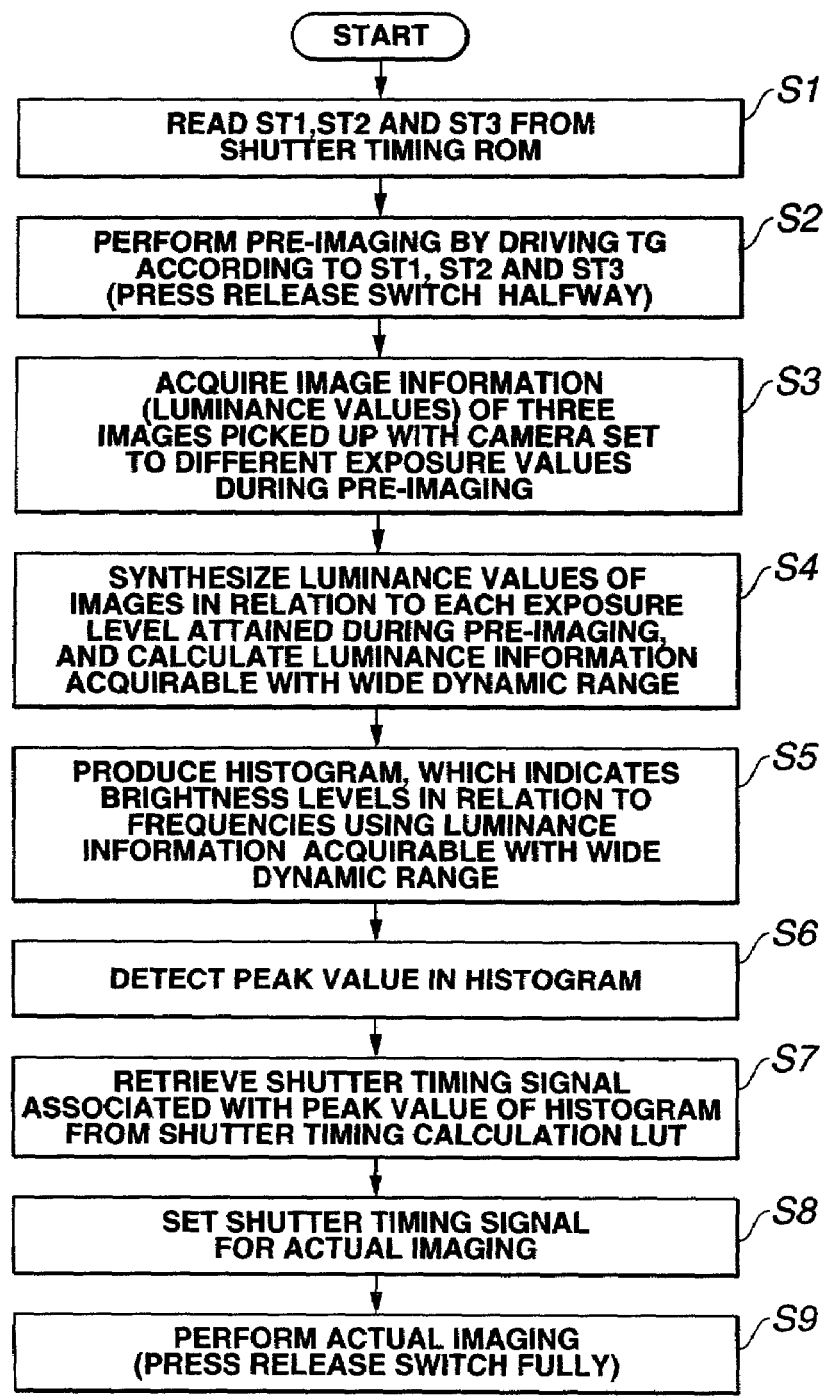
FIG. 3 is a flowchart describing operation to be performed in the digital still camera in accordance with the first embodiment in a photographic scene dependent photographing mode.
Figure 6:
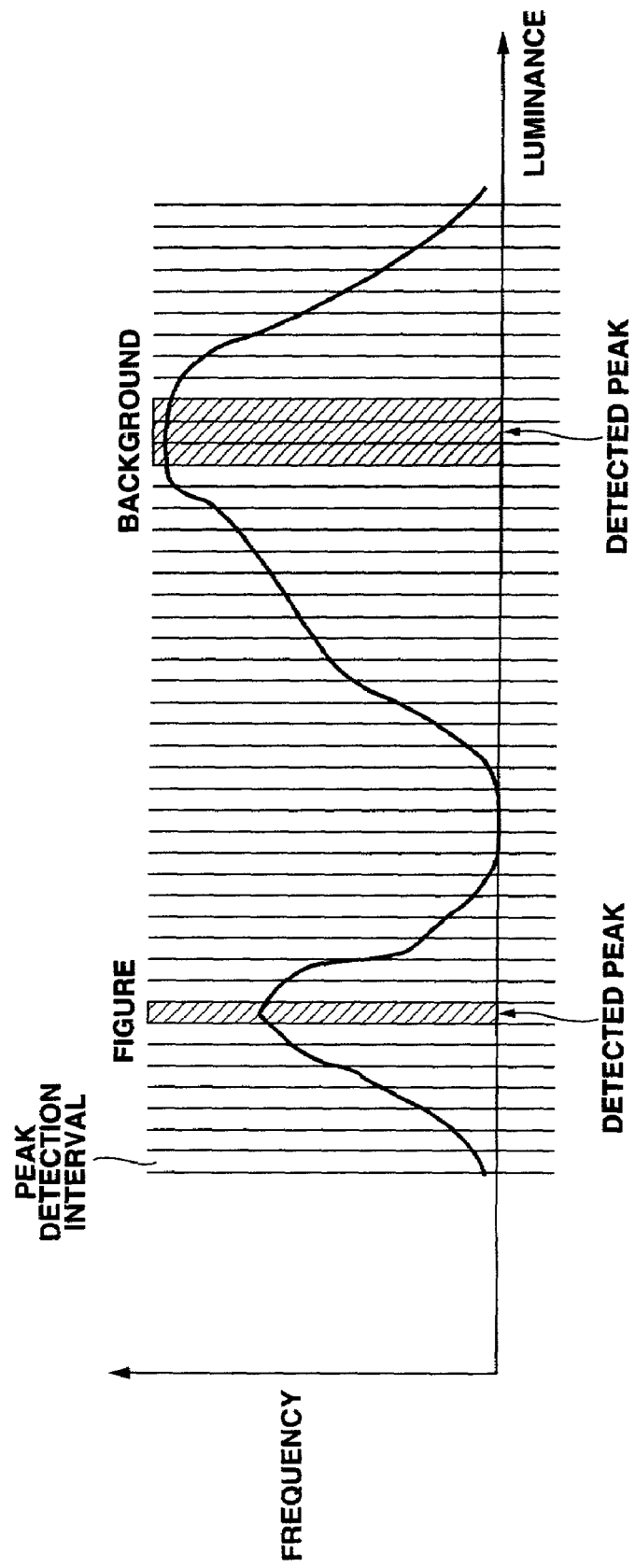
FIG. 6 is an explanatory diagram concerning operation to be performed for detecting peak frequencies of a histogram that are used to produce shutter timing signals, which are used for actual photographing, according to the first embodiment.
Figure 7:
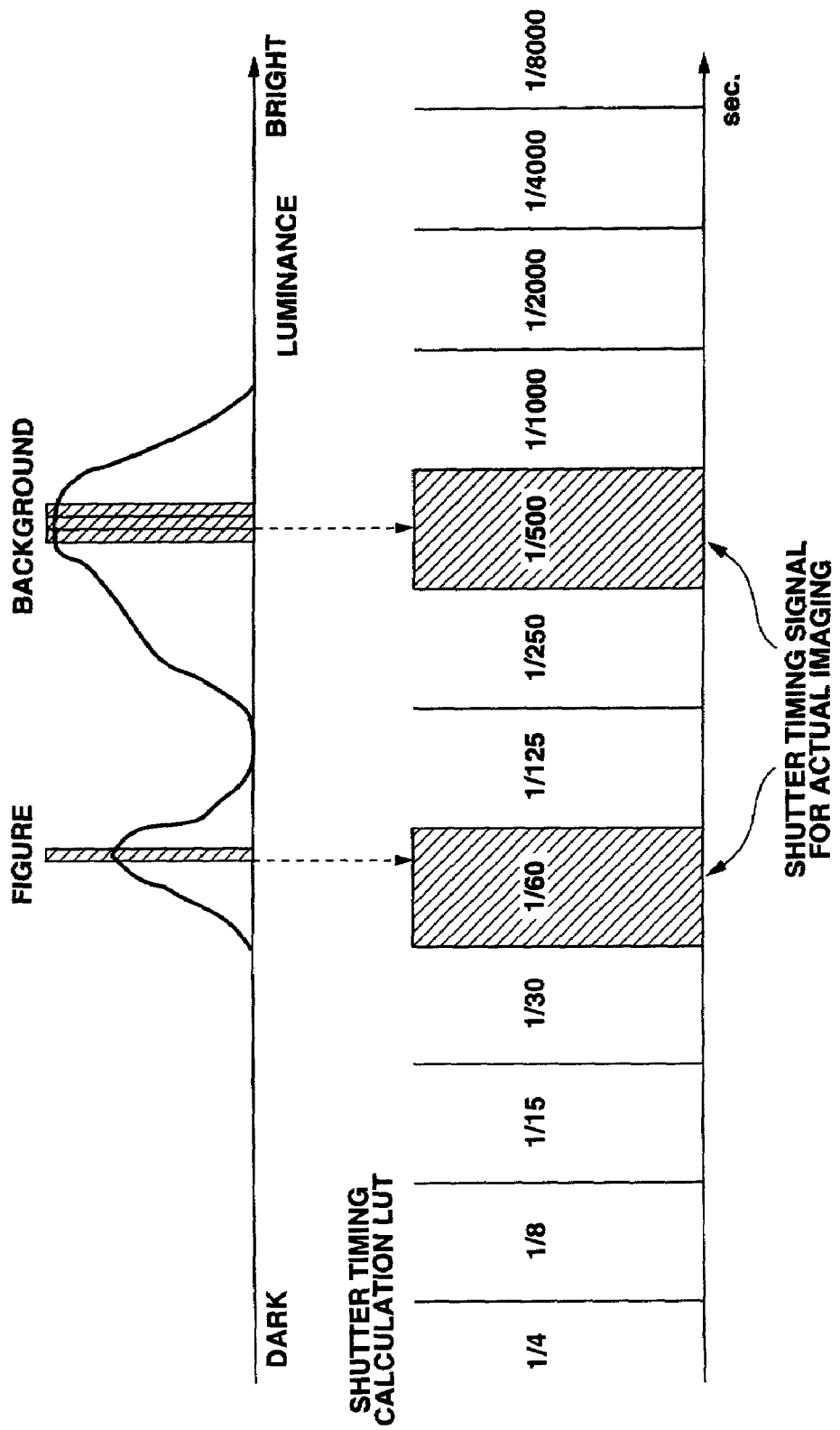
FIG. 7 is an explanatory diagram concerning operation to be performed for producing shutter timing signals using the peak frequencies of the histogram according to the first embodiment.

FIG. 1 to FIG. 7 show a first embodiment of the present invention. FIG. 1 is a block diagram showing the basic configuration of a digital still camera that is an image-pickup apparatus. FIG. 2 is a block diagram showing an example of the configuration of a shutter timing control circuit shown in FIG. 1. FIG. 3 is a flowchart describing operation to be performed by the digital still camera in a photographic scene dependent photographing mode. FIG. 4A shows an example of a photographic scene. FIG. 4B shows the distribution of brightness levels in the photographic scene shown in FIG. 4A. FIG. 5 is an explanatory diagram concerning operation to be performed for pre-photographing. FIG. 6 is an explanatory diagram showing operation to be performed for detecting peak frequencies of a histogram. FIG. 7 is an explanatory diagram concerning operation to be performed for producing shutter timing signals using the peak frequencies of the histogram.

A digital still camera shown in FIG. 1 employs an image-pickup device 1 that is a single-plate color CCD or the like having an electronic shutter facility. An object image is converged on the image-pickup device 1 via a lens 2 and a diaphragm/shutter mechanism 3. The object image is photoelectrically converted and transmitted as an image signal. The image signal representing the object image and being transmitted from the image-pickup device 1 has a noise component thereof removed by a correlative double sampling circuit or the like that is not shown. The resultant signal is amplified by an amplifier 4, digitized by an A/D converter 5, and transferred to a camera signal processing circuit 6. The camera signal processing circuit 6 processes the signal as image data.

An output of the A/D converter 5 is transferred to an AF/AE/AWB wave detecting circuit 7 and a shutter timing control circuit 21. The AF/AE/AWB wave detecting circuit 7 performs AF wave detection to acquire AF-related information that is needed to automatically control the focus of the camera prior to actual photographing. The AF/AE/AWB wave detecting circuit 7 also performs AE wave detection to acquire AE-related information that is needed to automatically control exposure. Moreover, the AF/AE/AWB wave detecting circuit 7 performs AWB wave detection to acquire AWB-related information that is needed to automatically set a white balance. The AF-related information, AE-related information, and AWB-related information are transferred to a CPU 8 that is a control means. The CPU 8 transfers the received information to the lens 2, diaphragm/shutter mechanism 3, and camera signal processing circuit 6. In a normal photographing mode, the CPU 8 produces a shutter timing signal using the AE-related information, and transmits the signals to a selection switch 22.

A shutter timing control circuit 21 that is an analyzing means produces photographing control information, which is needed to perform actual photographing, in a photographic scene dependent photographing mode (wide dynamic range photographing mode) under the control of the CPU 8 that is a conditions-for-photographing setting means. The photographing control information is provided as a shutter timing signal in the present embodiment. The shutter timing signal is transferred to the selection switch 22 and CPU 8.

The camera signal processing circuit 6 and CPU 8 are interconnected via a bus 23. A DRAM 11 used as a work memory to process color data contained in image data is connected on the bus 23 with a memory controller 10 between them. A compression circuit 9 for compressing image data sent from the camera signal processing circuit 6 in compliance with the JPEG or the like is connected to the bus 23. Moreover, a memory card interface 14 is connected to the bus 23 so that the image data compressed by the compression circuit 9 can be recorded on a memory card 15. A liquid crystal display (LCD) 13 is connected on the bus 23 with a display circuit 12 between them, whereby image data may be read from the memory card 15 and displayed on the LCD or a photographic state is presented on the LCD. A personal computer (PC) interface 16 is connected on the bus 23 so that image data recorded on the memory card 15 can be transferred to a personal computer 17.

A strobe 19, an input key 20, and a shutter timing ROM 24 are connected to the CPU 8. The strobe 19 is a flashlight emitting means that is controlled based on AE-related information produced by the AF/AE/AWB wave detecting circuit 7 or a shutter timing signal produced by the shutter timing control circuit 21. The input key 20 is used to designate any of various imaging modes or drive a trigger switch. A plurality of different shutter timing signals, that is, three shutter timing signals ST1, ST2, and ST3 employed in the present embodiment are stored in the shutter timing ROM 24. In a photographic scene dependent photographing mode, during pre-photographing succeeding actual photographing, information concerning a dynamic range, which is required to photograph a photographic scene, is acquired with a condition for exposure varied sequentially in response to the shutter timing signals. For example, the shutter timing signals ST1, ST2, and ST3 indicate shutter speed values of 1/30 sec. 1/500 sec, and 1/8000 sec respectively.

In a normal photographing mode, the selection switch 22 selects a shutter timing signal produced by the CPU 8 according to AE-related information under the control of the CPU 8, and transfers the shutter timing signal to a timing generator (TG) 18. In a photographic scene dependent photographing mode, the selection switch 22 selects a shutter timing signal produced by the shutter timing control circuit 21 and transfers the shutter timing signal to the timing generator 18. For actual photographing, the selection switch 22 selects a shutter timing signal produced by the shutter timing control circuit 21 and transfers the shutter timing signal to the timing generator 18. Based on the shutter timing signal selected by the selection switch 22, the timing generator 18 controls the electronic shutter facility included in the image-pickup device 1.

In the image-pickup apparatus shown in FIG. 1, the input key 20 is manipulated in order to manually select either the normal photographing mode in which images are not synthesized or the photographic scene dependent photographing mode in which images are synthesized if necessary. Otherwise, the CPU 8 detects a highlight represented by image information produced by the image-pickup device 1 by analyzing an output of the AF/AE/AWB wave detecting circuit 7. Thus, either the normal photographing mode or photographic scene dependent photographing mode is selected automatically. Based on the selected imaging mode, the CPU 8 controls imaging.

Specifically, when the normal photographing mode is selected, a photographic scene is photographed once with normal operation. Photographing information for one image field is acquired from the image-pickup device 1, and processed by the camera signal processing circuit 6. When the photographic scene dependent photographing mode is selected, a photographic scene is pre-photographed three times according to three shutter timing signals ST1, ST2, and ST3 stored in the shutter timing ROM 24. Information concerning a dynamic range required to construct three image fields is acquired from the image-pickup device 1 with an exposure level varied. A shutter timing signal is produced for actual photographing using the information concerning a dynamic range, and actual photographing is performed. The camera signal processing circuit 6 processes the image information resulting from the actual photographing.

Referring to FIG. 2, an example of the configuration of the shutter timing control circuit 21 shown in FIG. 1 will be described below.

The shutter timing control circuit 21 includes a switch 31, a signal synthesizing circuit 32, a signal distribution arithmetic circuit 33, a signal distribution analyzing circuit 34, a shutter timing calculating circuit 35, and a shutter timing calculation lookup table (LUT) 36.

The CPU 8 controls the switch 31 in the photographic scene dependent photographing mode so that the switch 31 will be on only during pre-photographing. During the pre-photographing, a photographic scene is sequentially photographed according to the shutter timings ST1, ST2, and ST3 respectively. Image values (luminance values) acquired are transferred to the signal synthesizing circuit 32 via the A/D converter 5.

The signal synthesizing circuit 32 that is an information synthesizing means synthesizes the received image values for three image fields in accordance with the exposure levels attained for photographing, and produces luminance information obtainable with a wide dynamic range. The luminance information is then transferred to the signal distribution arithmetic circuit 33.

The signal distribution arithmetic circuit 33 that is a histogram arithmetic means arithmetically produces a histogram, which represents the distribution of luminance levels in a photographic scene, using the received luminance information obtainable with a wide dynamic range, and transfers the result of arithmetic operation to the signal distribution analyzing circuit 34.

The signal distribution analyzing circuit 34 detects a luminance level relevant to a peak frequency of the received histogram, and transfers the luminance value of a peak frequency to the shutter timing calculating circuit 35. If the histogram contains a plurality of peak frequencies, the luminance levels relevant to each peak frequencies are detected.

The shutter timing calculating circuit 35 reads a shutter speed, which is indicated by a shutter timing signal, from the shutter timing calculation LUT 36 according to the received luminance value. The shutter timing signal indicating the read shutter speed is then transferred to the timing generator 18. The shutter timing signal is also transferred to the CPU 8 as data for use in controlling the strobe, whereby an amount of flashlight to be emitted from the strobe 19 is controlled in proportion to the shutter speed indicated by the shutter timing signal. Actual photographing is then performed.

In the shutter timing calculation LUT 36, the shutter timing signals that permit proper exposure are stored in association with luminance levels.

Operation to be performed in the photographic scene dependent photographing mode will be described with reference to FIG. 3 to FIG. 7.

FIG. 3 is a flowchart describing the operation to be performed in the photographic scene dependent photographing mode. In the photographic scene dependent photographing mode, first, the shutter timing signals ST1, ST2, and ST3 are read from the shutter timing ROM 24 (step S1). Based on the shutter timing signals ST1, ST2, and ST3, the timing generator 18 is driven in order to perform pre-photographing (step S2). Image values (luminance values) for three image fields are acquired with an exposure level varied (step S3). Incidentally, pre-photographing is started at step S2 by, for example, pressing a release switch halfway.

When pre-photographing is completed, the signal synthesizing circuit 32 synthesizes the luminance information of the images based on the exposure levels attained for pre-photographing, and produces luminance information obtainable with a wide dynamic range (step S4).

Figure 4A:
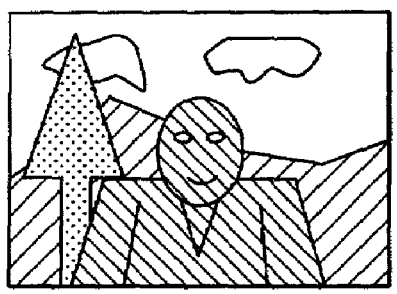
FIG. 4A shows an example of a photographic scene treated in the first embodiment.
Figure 4B:
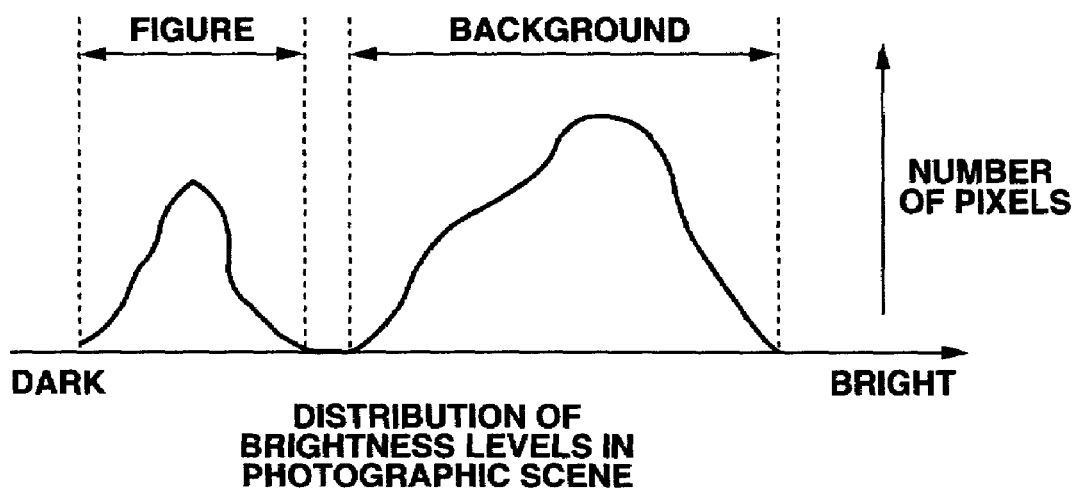
FIG. 4B shows the distribution of brightness levels in the photographic scene shown in FIG. 4A.

Assume that a photographic scene contains, as shown in FIG. 4A, a backlit scene containing a figure that is a dark major object and a bright background, and exhibits a brightness distribution shown in FIG. 4B. In this case, the photographic scene is pre-photographed with the shutter timing signals ST1, ST2, and ST3. The luminance information acquired in response to the shutter timing signals are matched to the exposure levels attained during pre-photographing. This results in photographic scene information shown in FIG. 5. Luminance values relevant to the same exposure level or brightness level are weighted with a coefficient proportional to the brightness level, and then added up. All the luminance values are then synthesized at step S4, whereby luminance information acquirable with a wide dynamic range is produced.

For example, assume that a luminance information acquired by performing pre-photographing with each shutter timing signal is expressed with 8 bits. In this case, the shutter timing signals ST1, ST2, and ST3 are determined so that luminance information acquired in response to two adjoining shutter timing signals and related to the same exposure level will be 2 bits long. Information of 20 bits long (approximately 120 dB) can be acquired as a result.

In reality, a photographic scene exhibiting such a large difference in brightness as to be expressed with luminance information of 20 bits long is exceptional. For example, assuming that luminance values related to the same exposure level are 4 bits long, luminance information of 16 bits long (approximately 96 dB) is acquired. In this case, since luminance values related to the same exposure level are 4 bits long out of 8 bits long, the ratio of the shutter speed values indicated by the adjoining shutter timing signals is 1:16. For example, as mentioned above, the shutter speed (exposure time) value indicated by the shutter timing signal ST1 is set to 1/30 sec. The shutter speed value indicated by the shutter timing signal ST2 is set to 1/500 sec. The shutter speed value indicated by the shutter timing signal ST3 is set to 1/8000 sec. Thus, assuming that luminance values acquired with the shutter speed set sequentially to the values indicated by the shutter timing signals ST1, ST2, and ST3 are Y1, Y2, and Y3, synthetic luminance information Y is calculated as Y=Y1+16×Y2+16××16×Y3.

Referring to FIG. 3, luminance information acquirable with a wide dynamic range is produced at step S4 as mentioned above. Thereafter, the signal distribution arithmetic circuit 33 produces a histogram, which represents the distribution of frequencies of brightness levels, using the luminance information (step S5). For example, when a photographic scene is the one shown in FIG. 4A, the produced histogram is outlined with a curve shown in FIG. 6.

Thereafter, the signal distribution analyzing circuit 34 detects a peak frequency of the histogram produced at step S5, and retrieves a luminance level related to the peak frequency (step S6). At step S6, a peak detection interval between instants at which a peak frequency of a histogram is detected is pre-set. When a slope determined by frequency values detected at the start and end of each peak detection interval changes from a positive value to a negative value, the frequency detected at the end of an immediately preceding peak detection interval is regarded as a peak frequency. A luminance level related to the peak frequency is then retrieved. In the case of the histogram shown in FIG. 6, a frequency indicated with a hatched bar and concerned with a figure is detected as a peak frequency, and a luminance level related to the peak frequency is retrieved. Referring to FIG. 6, the slope hardly changes during adjoining peak detection intervals (including an interval during which the slope determined with frequency values hardly changes from a positive value and an interval during which the slope changes to a negative value). The frequencies detected during the intervals are judged to share the same peak frequency value and detected as a peak frequency. A luminance level related to the peak frequency is then retrieved. Consequently, in the case of the histogram shown in FIG. 6, the adjoining frequencies indicated with the hatched bars and concerned with a background are detected as one peak frequency, and the luminance level related to the peak frequency is then retrieved. Therefore, when the photographic scene is as shown in FIG. 4A, two peak frequencies are detected, and related luminance levels are then retrieved.

A peak frequency of a histogram is used to obtain the imaging timing at which a related luminance level permits relatively appropriate exposure. As shown in FIG. 6, even when the frequencies indicated with the hatched bars and concerned with a background are detected as a peak frequency, luminance levels related to the frequencies do not vary very greatly but result from the same exposure. The peak frequency need therefore not be detected very strictly. Consequently, the signal distribution analyzing circuit 34 can be configured simply.

The luminance levels related to the peak frequencies are retrieved from the histogram at step S6. Thereafter, the shutter timing calculating circuit 35 retrieves, as shown in FIG. 7, a shutter speed value, which is indicated by a shutter timing signal and associated with each luminance level, from the shutter timing calculation LUT 36 (step S7). The shutter timing signal indicating the retrieved shutter speed value is used as shutter timing signals for actual photographing (step S8). With the shutter timing signal, for example, the release switch is pressed fully in order to start actual photographing (step S9).

Consequently, when a photographic scene is like the one shown in FIG. 4A, actual photographing makes it possible to acquire image information for two image fields at the exposure levels determined with the shutter speed values of 1/60 sec and 1/500 sec shown in FIG. 7. The camera signal processing circuit 6 that is an image information converting means synthesizes the image values for two image fields acquired during the actual photographing according to a known means. Eventually, an image obtainable with a wide dynamic range that is matched to a brightness range exhibited by the photographic scene can be produced.

As mentioned above, according to the present embodiment, in the photographic scene dependent photographing mode, a photographic scene is pre-photographed with the shutter speed set to the pre-set values indicated by the shutter timing signals ST1, ST2, and ST3 in order to acquire information concerning a dynamic range. A histogram graphically expressing synthetic information is produced. A shutter speed value to be indicated with a shutter timing signal is determined so that a luminance level related to a peak frequency of the histogram will permit relatively appropriate exposure. Actual photographing is then performed with the shutter speed set to the determined value. Even when a photographic scene exhibits a large brightness difference, the AE facility need not be driven all the time but imaging can be achieved optimally for the photographic scene. Eventually, an image obtainable with a wide dynamic range can be reproduced.

According to the present embodiment, all pixels are read during pre-photographing during which photographing is performed with the shutter speed set sequentially to the values indicated with the shutter timing signals ST1, ST2, and ST3 respectively. A histogram is then produced. The present invention is not limited to this mode. For example, the camera signal processing circuit 6 may thin out the pixels to read one pixel per two to eight pixels lined in a horizontal or vertical direction under the control of the CPU 8. A histogram may then be produced using the read pixels. In this case, precision deteriorates a little but a processing time can be shortened.

Figure 8:
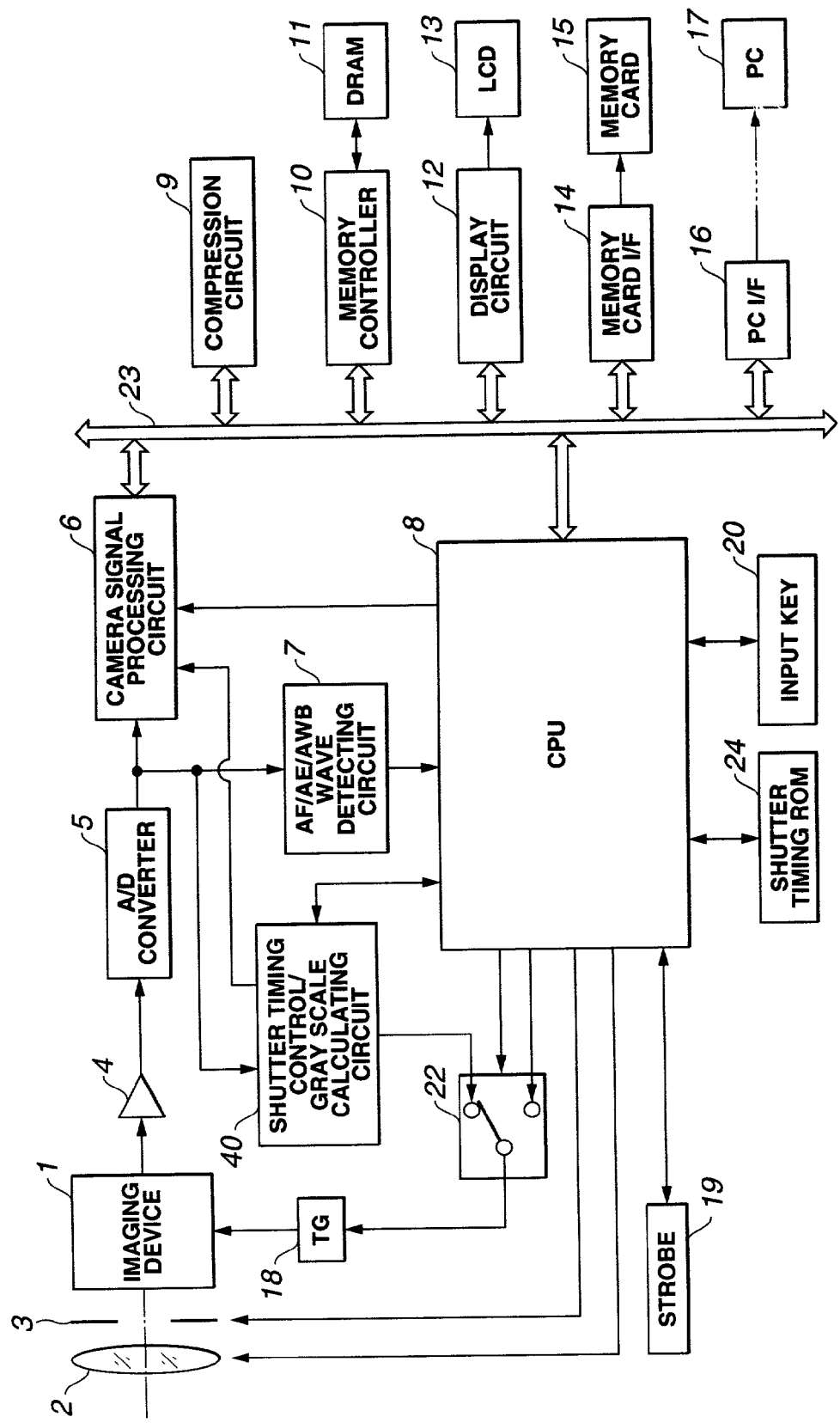
FIG. 8 is a block diagram showing the basic configuration of a digital still camera in accordance with a second embodiment of the present invention.
Figure 9:
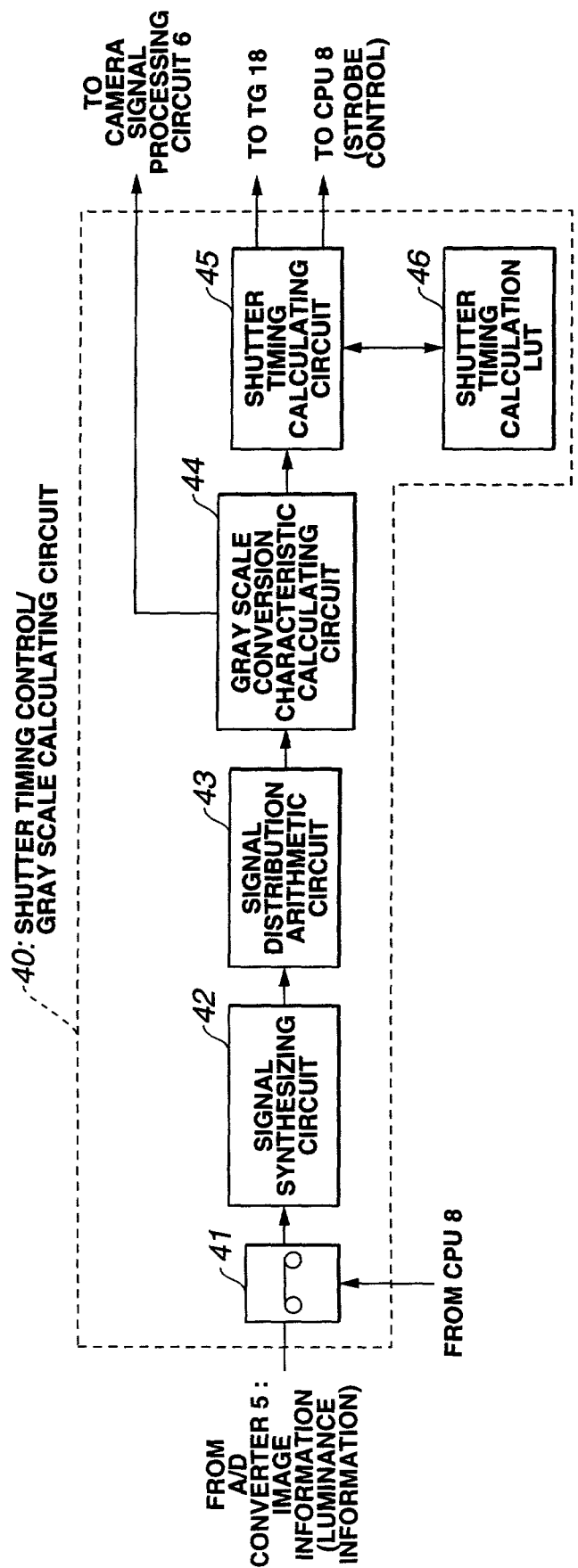
FIG. 9 is a block diagram showing an example of the configuration of a shutter timing control/gray scale calculating circuit shown in FIG. 8.

FIG. 8 to FIG. 11 show a second embodiment of the present invention. FIG. 8 is a block diagram showing the basic configuration of a digital still camera that is an image-pickup apparatus. FIG. 9 is a block diagram showing an example of the configuration of a shutter timing control/gray scale calculating circuit shown in FIG. 8. FIG. 10A shows an example of frequencies related to brightness levels. FIG. 10B is a diagram outlining a cumulative histogram that represents the distribution of cumulative frequencies and is produced using frequencies that are contained in the received histogram shown in FIG. 10A and that are equal to or larger than a predetermined threshold. FIG. 11 is an explanatory diagram concerning operation to be performed for calculating a shutter speed value, which is indicated by a shutter timing signal, using a gray scale conversion characteristic curve.

The digital still camera in accordance with the second embodiment includes a shutter timing control/gray scale calculating circuit 40 on behalf of the shutter timing control circuit 21 shown in FIG. 1. The other components are identical to those shown in FIG. 1. The same reference numerals will be assigned to components having the same capabilities, and the description of the components will be omitted.

The shutter timing control/gray scale calculating circuit 40 that is an analyzing means includes, as shown in FIG. 9, a switch 41, a signal synthesizing circuit 42 that is an information synthesizing means, a signal distribution arithmetic circuit 43 that is a histogram arithmetic means, a gray scale conversion characteristic calculating circuit 44, a shutter timing calculating circuit 45, and a shutter timing calculation LUT 46.

According to the second embodiment, similarly to the aforesaid first embodiment, when the photographic scene dependent photographing mode is designated, the CPU 8 controls the switch 41 so that the switch 41 will be on only during pre-photographing. During pre-photographing, a photographic scene is imaged with the shutter speed set to the values indicated by the shutter timing signals ST1, ST2, and ST3 respectively. The acquired image values (luminance values) are transferred to the signal synthesizing circuit 42 via the A/D converter 5. The image values for three image fields are synthesized based on exposure levels attained during imaging, whereby luminance information acquirable with a wide dynamic range is produced. The luminance information is transferred to the signal distribution arithmetic circuit 43. A histogram representing the distribution of luminance levels in the photographic scene is then produced arithmetically.

The histogram arithmetically produced by the signal distribution arithmetic circuit 43 is transferred to the gray scale conversion characteristic calculating circuit 44 that is a gray scale arithmetic means. The gray scale conversion characteristic calculating circuit 44 produces a gray scale conversion characteristic curve using the received histogram. According to the present embodiment, frequencies equal to or larger than a predetermined threshold are retrieved from the receive histogram shown in FIG. 10A, and a histogram of cumulative frequencies is then arithmetically produced. This results in the cumulative histogram that is, as shown in FIG. 10B, devoid of frequencies of luminance levels affected by noise. The cumulative histogram is transferred as a gray scale conversion characteristic curve to the camera signal processing circuit 6. The cumulative histogram is used to convert image information acquired during actual photographing, and then transferred to the shutter timing calculating circuit 45.

The shutter timing calculating circuit 45 reads a shutter speed value, which is represented by a shutter timing signal, from the shutter timing calculation LUT 46 using the received gray scale conversion characteristic curve. The shutter timing signal indicating the read shutter speed value is transferred to the timing generator 18, and also transferred to the CPU 8 as a strobe control signal in the same manner as it is in the first embodiment. Actual photographing is then performed. Similarly to the first embodiment, in the second embodiment, shutter speed values that are indicated by shutter timing signals and permit appropriate exposure are stored in association with luminance levels in the shutter timing calculation LUT 46.

In order to determine a shutter speed value, which is indicated by a shutter timing signal and used for actual photographing, using the gray scale conversion characteristic curve, a domain having a slope, that is, a domain interposed between those whose slopes are equal to or smaller than a predetermined value is detected. In other words, a domain indicating an area in an image field in which image data is present at a high density is detected in the characteristic curve. Frequencies contained in the domain detected in the characteristic curve that outlines a cumulative histogram are weighted, and luminance levels related to the weighted frequencies are averaged or a mean of the luminance levels is obtained. A shutter speed value associated with the obtained luminance level is retrieved from the shutter timing calculation LUT 46 and indicated by a shutter timing signal.

Assume that a luminance histogram concerning a photographic scene is like the one shown in FIG. 10A. In this case, similarly to the first embodiment, actual photographing makes it possible to acquire image values for two image fields at different exposure levels determined with shutter speed values of $\frac{1}{60}$ sec and $\frac{1}{500}$ sec shown in FIG. 11. The camera signal processing circuit 6 synthesizes the image values for two image fields acquired during the actual photographing according to a known means. Eventually, an image obtainable with a wide dynamic range that is matched to a brightness range exhibited by the photographic scene is produced.

As mentioned above, according to the present embodiment, in the photographic scene dependent photographing mode, a photographic scene is pre-photographed with the shutter speed set to the pre-set values indicated by the shutter timing signals ST1, ST2, and ST3. Information concerning a dynamic range is then acquired. A gray scale conversion characteristic curve is produced by removing frequencies of luminance levels affected by noise from a histogram produced using the synthetic information. A shutter speed value to be indicated by a shutter timing signal and adopted for actual photographing is determined using the gray scale conversion characteristic curve. Actual photographing is then performed with the shutter speed set to the determined value. Eventually, even if a photographic scene exhibits a large brightness difference, a good-quality image obtainable with a wide dynamic range that is matched to a brightness range exhibited by the photographic scene can be produced. Moreover, the gray scale conversion characteristic curve produced by the gray scale conversion characteristic calculating circuit 44 is transferred to the camera signal processing circuit 6 so that it will be used to convert image information acquired during actual photographing. It is therefore unnecessary to produce a gray scale conversion characteristic curve in the course of processing image information values acquired during actual photographing. Consequently, image values acquired during actual photographing can be processed readily and quickly.

The present invention is not limited to the aforesaid embodiments. Various variants or modifications can be made. For example, according to the aforesaid embodiments, in the photographic scene dependent photographing mode, a photographic scene is pre-photographed in response to three shutter timing signals in order to acquire information concerning a dynamic range that is required to photograph the photographic scene. The number of shutter timing signals is not limited to three but may be any value equal to or larger than 2. Moreover, the aforesaid embodiments have been described by taking for instance a photographic scene that is actually photographed in response to two shutter timing signals to be produced. Depending on a photographic scene, one or more than three shutter timing signals may be produced for actual photographing. Therefore, when only one shutter timing signal is produced, the camera signal processing circuit 6 need not perform image synthesis. When two or more shutter timing signals are produced, image synthesis is performed in order to produce an image optimal to a photographic scene.

Moreover, according to the aforesaid embodiments, when pre-photographing or actual photographing is performed in the photographic scene dependent photographing mode, the electronic shutter facility included in the image-pickup device 1 is controlled via the timing generator 18 that receives a shutter timing signal. The diaphragm/shutter mechanism 3 may be controlled on behalf of the electronic shutter facility included in the image-pickup device 1. Otherwise, both the electronic shutter facility included in the image-pickup device 1 and the diaphragm/shutter mechanism 3 may be controlled in order to acquire image information of a photographic scene under a desired condition for exposure.

A photographic scene is pre-photographed with a condition for exposure varied prior to actual photographing, whereby information concerning a dynamic range is acquired. Actual photographing is then performed based on the acquired information concerning a dynamic range. Therefore, even when a photographic scene exhibits a large brightness difference, an image obtainable with a wide dynamic range that is matched to a brightness range exhibited by the photographic scene can be produced without the necessity of driving the AE facility all the time.

Figure 12:
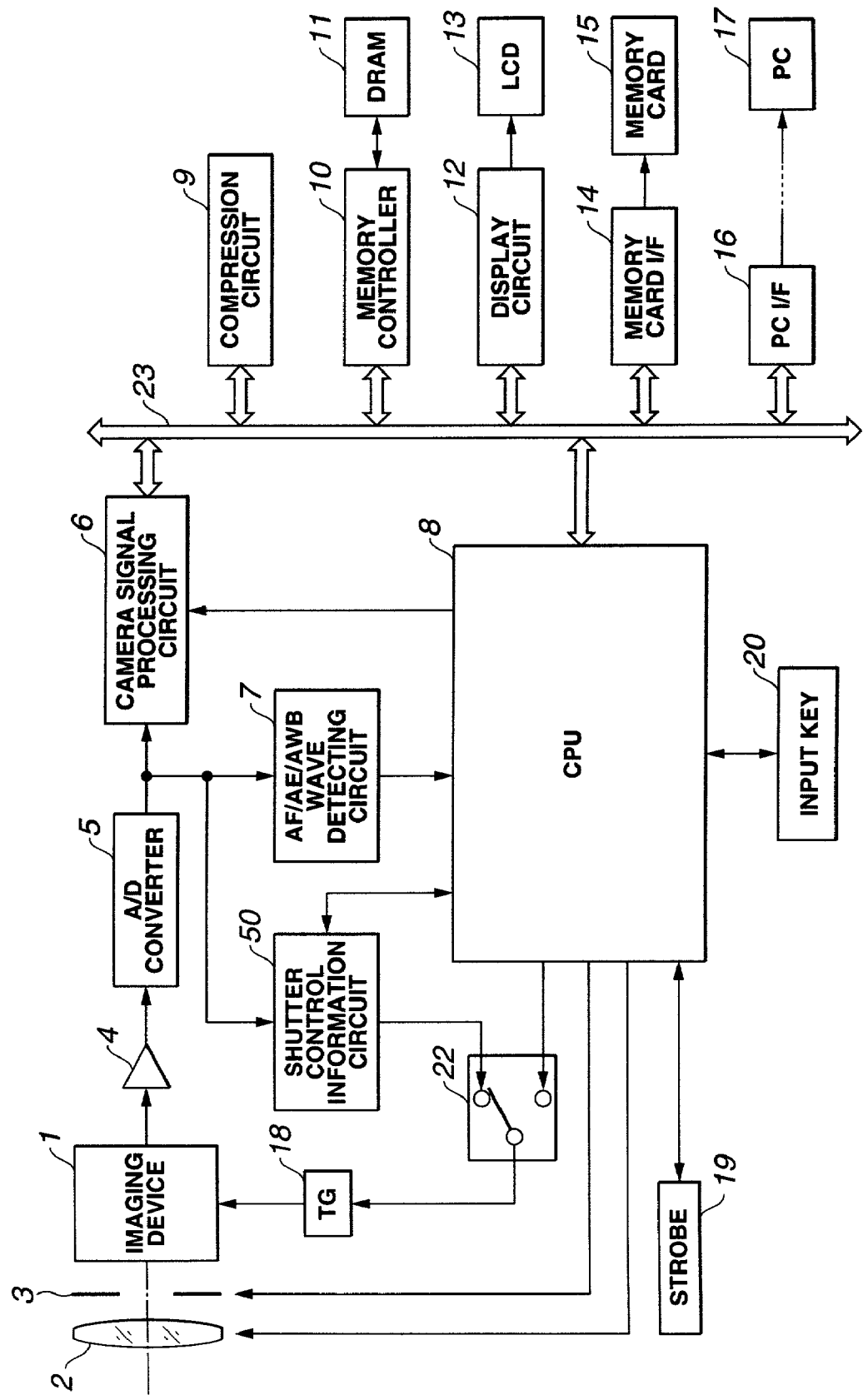
FIG. 12 is a block diagram showing the basic configuration of a digital still camera in accordance with a third embodiment of the present invention.

FIG. 12 to FIG. 15J show a third embodiment of the present invention. FIG. 12 is a block diagram showing the basic configuration of a digital still camera.

The major portion of the digital still camera in accordance with the third embodiment is substantially identical to that of the digital still camera in accordance with the first embodiment. The same reference numerals are assigned to components that have the same capabilities as those included in the first embodiment. A significant difference lies in that a shutter control information circuit 50 is substituted for the shutter timing control circuit 21 and the shutter timing ROM 24 is excluded.

To be more specific, the digital still camera consists mainly of, as shown in FIG. 12, an image-pickup device 1, a lens 2, a diaphragm/shutter mechanism 3, an amplifier 4, an A/D converter 5, a camera signal processing circuit 6, an AF/AE/AWB wave detecting circuit 7, a compression circuit 9, a memory card interface 14, and a memory card 15. The image-pickup device 1 includes a single-plate color CCD that has an electronic shutter facility, and serves as a photographing means for photoelectrically converting an object image and providing image information. The lens 2 causes the object image to converge at the image-pickup device 1. The diaphragm/shutter mechanism 3 controls a passage range of light that passes through the lens 2 and a passage time required for the light that passes through the lens 2. The amplifier 4 amplifies image information of which noise component is removed by a correlative double sampling circuit, which is not shown, after being transferred from the image-pickup device 1. The A/D converter 5 converts analog information, which is amplified by the amplifier 4, into digital information. The camera signal processing circuit 6 performs various kinds of processing on the signal digitized by the A/D converter 5. The AF/AE/AWB wave detecting circuit 7 receives the digital signal from the A/D converter 5, and detects automatic focusing (AF)-related information, automatic exposure (AE)-related information, and automatic white balance control (AWB)-related information. The compression circuit 9 compresses image data sent from the camera signal processing circuit 6 in compliance with the JPEG or the like. The memory card interface 14 extends control so that the image data compressed by the compression circuit 9 can be recorded on the memory card 15. The memory card 15, which is a nonvolatile recording medium, records the image data under the control of the memory card interface 14. The digital still camera further includes a DRAM 11, a memory controller 10, a personal computer interface (PC I/F) 16, a display circuit 12, an LCD 13, a strobe 19, a timing generator (TG) 18, an input key 20, a shutter control information circuit 50, a selection switch 22, and a CPU 8. The DRAM 11 is used as a work memory to process color data contained in image data. The memory controller 10 controls the DRAM 11. The personal computer (PC) interface 16 is an interface for transferring image data from the memory card 15 to a personal computer (PC) 17 or the like. The display circuit 12 controls the LCD 13 that will be described later. The LCD 13 reproduces and displays image data recorded on the memory card 15 under the control of the display circuit 12, and presents various photographic states of the digital still camera. The strobe 19 serves as a flashlight emitting means for emitting illumination light with which an object is illuminated. The timing generator 18 generates a timing pulse that is used to drive the image-pickup device 1. The input key 20 includes a switch used to designate any of various imaging modes and a trigger switch used to instruct start of photographing operation. The shutter control information circuit 50 receives a digital signal from the A/D converter 5, and designates a condition for exposure as one of the conditions for actual photographing that is performed in a wide dynamic range photographing mode that will be described later. Moreover, the shutter control information circuit 50 outputs information concerning an exposure level, such as, an exposure time. The selection switch 22 controls input of information concerning an exposure level according to what imaging mode is designated. The CPU 8 is connected to the camera signal processing circuit 6, compression circuit 9, memory controller 10, display circuit 12, memory card interface 14, and personal computer interface 16 over a bus 23. The CPU 8 receives the result of detection performed by the AF/AE/AWB wave detecting circuit 7, an input signal that is produced responsively to a manipulation performed on the input key 20, control information sent from the shutter control information circuit 50, or light emission information sent from the strobe 19. The CPU 8 controls the whole of the digital still camera including the lens 2, diaphragm/shutter mechanism 3, selection switch 22, camera signal processing circuit 6, strobe 19, input key 20, and other circuits interconnected over the bus 23.

The digital still camera can be set to a normal photographing mode or a wide dynamic range photographing mode. In the normal photographing mode, one image is picked up through one exposure and image data is produced. In the wide dynamic range photographing mode, a plurality of images is picked up at mutually close time instants with an exposure level varied, and synthesized in order to produce an image obtainable with a wide dynamic range.

A user manipulates the input key 20 to designate either of the imaging modes. Otherwise, the CPU 8 detects a highlight represented by image information sent from the image-pickup device 1, and autonomously designates an imaging mode. Depending on which of the imaging modes is designated, the CPU 8 controls imaging.

Specifically, when the normal photographing mode is selected, exposure is performed once during photographing in order to acquire image information for one image field from the image-pickup device 1. When the wide dynamic range photographing mode is selected, the same object is exposed a plurality of times in order to acquire image information for a plurality of image fields (for example, two image fields) from the image-pickup device 1 with an exposure level varied. The camera signal processing circuit 6 processes image data according to what imaging mode is selected.

The exposure is performed according to a known means, that is, using the electronic shutter facility included in the image-pickup device 1 or using the electronic shutter facility in combination with the diaphragm/shutter mechanism 3.

Furthermore, when the normal photographing mode is selected, the CPU 8 produces shutter control information, with which exposure is performed to pick up one image, according to the result of detection performed by the AF/AE/AWB wave detecting circuit 7. The CPU 8 drives the selection switch 22 so that the resultant information will be transferred to the timing generator 18.

When the wide dynamic range photographing mode is selected, the shutter control information circuit 50 produces shutter control information, with which exposure is performed to pick up a plurality of images with an exposure level varied. The shutter control information circuit 50 then drives the selection switch 22 so that the resultant information will be transferred to the timing generator 18.

FIG. 13 is a block diagram showing the configuration of the shutter control information circuit 50.

According to the third embodiment, the shutter is controlled on the assumption that when the wide dynamic range photographing mode is selected, exposure is performed twice with a condition for exposure varied.

When the conditions for actual photographing are determined, luminance information concerning a photographic scene is adopted as information concerning a dynamic range needed to photograph the photographic scene.

First, pre-photographing is performed under a condition for exposure determined through normal automatic exposure (AE) in order to acquire luminance information concerning a photographic scene. Consequently, the A/D converter 5 transmits luminance information aa concerning the photographic scene.

The scene information distribution calculating circuit 51 serving as an information acquiring means receives the luminance information aa, produces the distribution of luminance information (histogram), and transmits the distribution as luminance distribution information bb.

The scene information analyzing circuit 52 serving as an analyzing means receives the luminance distribution information bb, analyzes the histogram concerning the luminance distribution information bb, and transmits the result of the analysis as luminance analysis information cc. During the analysis of the histogram, the frequency of a luminance level indicating a dark point (shadow) and the frequency of a luminance level indicating a bright point (highlight) are retrieved from the histogram.

A conditions-for-exposure judging circuit 53 serving as an conditions-for-photographing setting means and a control means receives the luminance analysis information cc, and judges whether a currently set condition for exposure is appropriate. The judgment is made to reach the conclusion that the current condition for exposure should be changed and pre-photographing should be performed again (change of a condition for exposure) or that the current condition for exposure should be adopted as one of the conditions for actual photographing (determination of a condition for exposure). A destination to which information representing the condition for exposure is transmitted is changed based on the conclusion. At the same time, the result of the judgment is transmitted as exposure optimization information dd to the CPU 8.

First, assuming that the result of judgment made to see if a condition for exposure is appropriate is "determination of a condition for exposure", the conditions-for-exposure judging circuit 53 transmits actual photographing exposure information ff as a condition for exposure that is one of the conditions for actual photographing. A shutter control information-for-actual photographing producing circuit 55 serving as a conditions-for-photographing setting means receives the actual photographing exposure information ff, produces shutter control information with which actual photographing is performed, and transmits the shutter control information as actual photographing shutter control information hh.

On the other hand, when the result of judgment made to see if a condition for exposure is appropriate is "change of a condition for exposure", the conditions-for-exposure judging circuit 53 transmits changed exposure information ee as a condition for exposure to be changed. A conditions-for-exposure changing circuit 54 serving as a conditions-for-photographing setting means and a control means receives the changed exposure information ee, changes the current condition for exposure, and produces shutter control information that matches the changed condition for exposure and that is used to perform pre-photographing again. The conditions-for-exposure changing circuit 54 then transmits the shutter control information as pre-photographing shutter control information gg.

A shutter control information selection switch 56 switches input signals according to control information ii sent from the CPU 8 that has received the exposure optimization information dd from the conditions-for-exposure judging circuit 53. Since the shutter control information selection switch 56 thus switches input signals, the pre-photographing shutter control information gg or actual photographing shutter control information hh is transmitted as shutter control information kk to the selection switch 22.

Moreover, the CPU 8 judges from the result of judgment, which is represented by the exposure optimization information dd, whether pre-photographing should be performed again or a standby state should be retained until actual photographing is started.

Specifically, if the exposure optimization information dd represents "change of a condition for exposure", the CPU 8 instructs that pre-photographing should be performed again according to the shutter control information kk produced by the conditions-for-exposure changing circuit 54 in order to acquire luminance information concerning a photographic scene. The CPU 8 then instructs the shutter control information circuit 50 to perform the foregoing processing according to the luminance information aa produced by the A/D converter 5.

If the exposure optimization information dd represents "determination of a condition for exposure", the CPU 8 retains a standby state until actual photographing is started in order to produce an image obtainable with a wide dynamic range by performing imaging according to the shutter control information kk produced by the shutter control information-for-actual photographing producing circuit 55.

FIG. 14 is a flowchart describing processing to be performed by the shutter control information circuit 50.

Referring to FIG. 14, a description will be made using each information shown in FIG. 13.

When the processing is started, the scene information distribution calculating circuit 51 produces a histogram of luminance information aa concerning a photographic scene (step S11). The histogram to be produced is equivalent to luminance distribution information bb shown in FIG. 13.

Thereafter, the scene information analyzing circuit 52 references the produced histogram to obtain the frequency of a luminance level indicating a dark point and the frequency of a luminance level indicating a bright point (step S12). The obtained frequencies and related luminance levels are equivalent to luminance analysis information cc shown in FIG. 13.

Thereafter, the frequency of the luminance level indicating a bright (dark) point is compared with a predetermined value (for example, 10% of the sum total of frequency values contained in the histogram) (step S13).

If it is judged at step S13 that the frequency of the luminance level indicating a bright (dark) point is equal to or larger than the predetermined value, it is thought that a highlight (shadow) results from photographing to be performed under a current condition for exposure. The current condition for photographing is therefore changed to the one determining an exposure value (EV) that makes an image one-step darker (brighter) (step S14). The condition for exposure treated at step S14 is equivalent to changed exposure information ee shown in FIG. 13.

Thereafter, the conditions-for-exposure changing circuit 54 produces pre-photographing shutter control information gg, which is needed to perform pre-photographing again, according to the changed condition for exposure (step S15).

The produced pre-photographing shutter control information gg is transmitted as shutter control information kk through the shutter control information selection switch 56. The CPU 8 is thus instructed to perform pre-photographing again according to the shutter control information kk (step S16). The instruction given to the CPU 8 at step S16 is equivalent to exposure optimization information dd shown in FIG. 13.

On the other hand, if it is judged at step S13 that the frequency of the luminance level indicating a bright (dark) point is smaller than the predetermined value, it is thought that imaging to be performed under a current condition for exposure is optimal for the relatively bright (dark) object. Under the current condition for exposure (that is, actual photographing exposure information ff shown in FIG. 13), the shutter control information-for-actual photographing producing circuit 55 produces actual photographing shutter control information hh that is needed to perform actual photographing (step S17).

The produced actual photographing shutter control information hh is transmitted as shutter control information kk through the shutter control information selection switch 56. The CPU 8 is thus informed of the fact that actual photographing can be performed based on the shutter control information kk (the standby state is retained). The information given to the CPU 8 is, like the instruction given at step S16, equivalent to the exposure optimization information dd shown in FIG. 13.

When step S16 or S18 is completed, the processing is terminated.

Herein, when exposure is performed twice with a condition for exposure varied as it is in the present embodiment, imaging including the processing described in FIG. 14 is performed as mentioned below.

As mentioned above, an initial condition for exposure is determined based on normal automatic exposure (AE)-related information, and pre-photographing is performed.

Thereafter, as described in FIG. 14, both processing concerning a bright point and processing concerning a dark point are carried out.

When both the processing concerning a bright point and the processing concerning a dark point enter the step at which a standby state is retained until actual photographing is started, photographing is performed once. This is because it is unnecessary to perform imaging twice under the same condition for exposure (the photographing is the same as the photographing in the normal photographing mode).

If a condition for exposure is changed in both the bright and dark points as they are at step S14, the condition for exposure is changed such that an exposure value (EV) makes an image one-step darker (condition for exposure determining a one-step smaller EV). Moreover, the condition for exposure is changed such that an EV makes an image one-step brighter (condition for exposure determining a one-step larger EV). Then, pre-photographing is performed again with the respective condition for exposure varied as mentioned above.

Thereafter, the processing described in FIG. 14 is performed. If the condition for exposure is the condition for exposure determining a one-step smaller EV, information concerning the bright point alone is processed. If the condition for exposure is changed as described as step S14, the condition for exposure is changed such that an EV makes an image one-more-step darker (that is, a two-steps smaller EV). Pre-photographing is then performed again. Thereafter, the processing described in FIG. 14 is performed on the information concerning the bright point alone.

If the condition for exposure is the condition for exposure determining a one-step larger EV, information concerning the dark point alone is processed. If the condition for exposure is changed as described as step S14, the condition for exposure is changed such that an EV makes an image one-more-step brighter (that is, a two-steps larger EV). Pre-photographing is then performed again. Thereafter, the processing described in FIG. 14 is performed on the information concerning the dark point alone.

Furthermore, in the case of the condition for exposure is changed as described as step S14 relative to photographing of either the bright or dark point, changing of the condition is made as follows. When the condition for exposure may be changed relative to photographing of the bright point, the condition for exposure is changed such that an EV makes an image one-step darker (one-step smaller EV). When the condition for exposure is changed relative to photographing of the dark point, the condition for exposure is changed such that an EV makes an image one-step brighter (one-step larger EV). Thereafter, the processing of information concerning either the bright or dark point is performed.

FIG. 15A to FIG. 15J show images concerning processing performed in the shutter control information circuit 50.

Figure 15A:
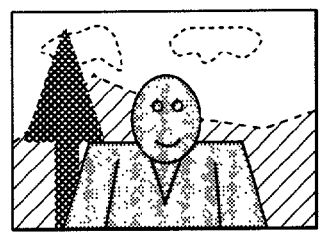
FIG. 15A, FIG. 15B, FIG. 15C, FIG. 15D, FIG. 15E, FIG. 15F, FIG. 15G, FIG. 15H, FIG. 15I, and FIG. 15J show images concerning processing to be performed by the shutter control information circuit employed in the third embodiment.
Figure 15B:
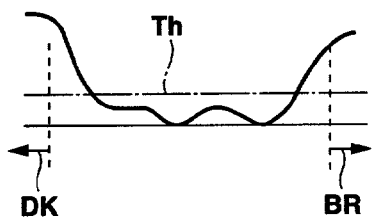

First, pre-photographing is performed under an initial condition for exposure (for example, with an exposure time set to ⅟250 sec). Consequently, luminance information concerning a photographic scene shown in FIG. 15A is acquired. A luminance histogram produced this time represents a distribution like the one shown in FIG. 15B. In this case, the frequency of a luminance level indicating a dark point DK (left side of a left-hand dashed line) and the frequency of a luminance level indicating a bright point BR (right side of a right-hand dashed line) are so large as to exceed a frequency threshold Th. The frequency threshold Th is indicated with a dotted-chain line and used as a criterion for a condition for exposure. The condition for exposure must therefore be changed both the bright point BR and the dark point DK.

Thereafter, the condition for exposure is changed relative to the bright point BR and the dark point DK respectively. Pre-photographing is performed again in order to acquire luminance information.

Figure 15C:
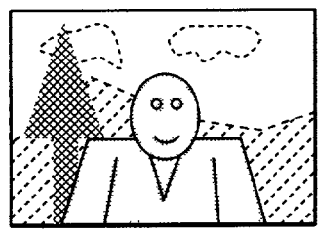
Figure 15E:
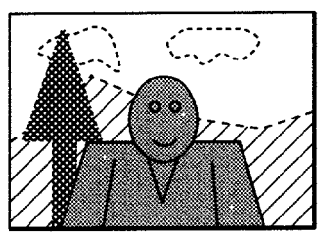
Figure 15D:
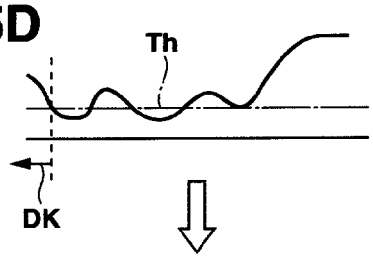
Figure 15F:
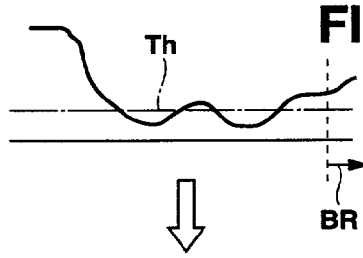
Figure 15G:
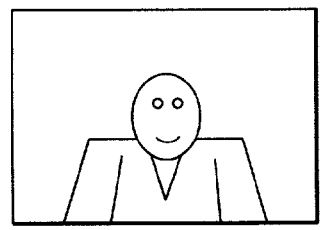
Figure 15I:
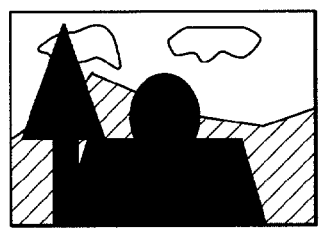
Figure 15H:
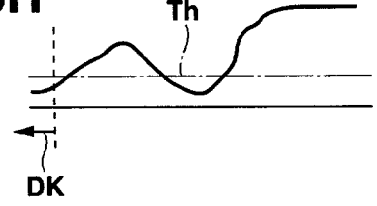

First, an initial condition for exposure under which the dark point DK is imaged is changed such that an EV that makes an image one-step brighter (a one-step larger EV, that is, with an exposure time set to ⅟125 sec). At this time, luminance information like the one shown in FIG. 15C is acquired. A luminance histogram like the one shown in FIG. 15D is then produced. In this case, the condition for exposure under which the dark point DK is imaged is checked based on the criterion for a condition for exposure. Since the frequency of the luminance level indicating the dark point DK still exceeds the frequency threshold Th, the condition for exposure is requested to be further changed. The condition for exposure is then changed such that an EV makes an image two-steps brighter (a two-steps larger EV, that is, with the exposure time set to ⅟60 sec). Pre-photographing is performed again in order to acquire luminance information. The luminance information acquired under the condition for exposure determining a two-steps larger EV is, for example, like the one shown in FIG. 15G. A luminance histogram like the one shown in FIG. 15H is produced accordingly. As illustrated, the frequency of the luminance level indicating the dark point DK is smaller than the frequency threshold Th. The condition for exposure (the exposure time set to ⅟60 sec) is adopted as one of the conditions for actual photographing. Consequently, the conditions for actual photographing are determined so that a figure contained in the photographic scene shown in FIG. 15A can be imaged while being exposed properly.

Figure 15J:
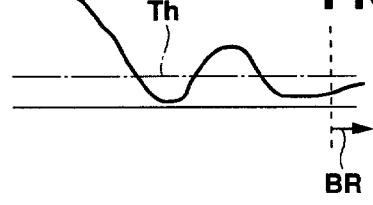

On the other hand, the condition for exposure under which the bright point BR is imaged is changed such that an EV makes an image one-step darker (one-step smaller EV, that is, with the exposure time set to ⅟500 sec). At this time, luminance information like the one shown in FIG. 15E is acquired, and a luminance histogram like the one shown in FIG. 15F is produced accordingly. The condition for exposure is checked based on the criterion for a condition for exposure to see if the bright point BR is photographed properly under the condition. In this case, the frequency of the luminance value indicating the bright point BR, which is contained in the histogram, exceeds the frequency threshold Th. Similarly to the case of the dark point DK, the condition for exposure is requested to be further changed. The condition for exposure is therefore changed such that an EV makes an image two-steps darker (two-steps smaller EV, that is, with the exposure time set to ⅟1000 sec). Pre-photographing is then performed again in order to acquire luminance information. The luminance information acquired under the condition for exposure determining the two-steps smaller EV is, for example, like the one shown in FIG. 15I, and a luminance histogram like the one shown in FIG. 15J is produced accordingly. As illustrated, the frequency of the luminance level indicating the bright point BR, which is contained in the histogram, is smaller than the frequency threshold Th. The condition for exposure determined this time (the exposure time set to ⅟1000 sec) is therefore adopted as the other one of the conditions for actual photographing. Consequently, the conditions for actual photographing are determined so that the background of the photographic scene like the one shown in FIG. 15A can be imaged while being exposed properly.

When the photographic scene like the one shown in FIG. 15A is photographed in the wide dynamic range photographing mode, exposure is performed twice continuously under the conditions for imaging including the condition of the exposure time set to ⅟60 sec and the condition of the exposure time set to ⅟1000 sec. Both proper image information concerning the figure and proper image information concerning the background are acquired and then synthesized. This results in an image obtainable with a wide dynamic range. In the image, both the figure and background appear in a properly exposed state.

According to the third embodiment, prior to actual photographing, information concerning a dynamic range needed to photograph a photographic scene is acquired and analyzed. The conditions for actual photographing are determined based on the results of the analysis. Imaging is then achieved by performing one exposure or by performing a plurality of exposures with a condition for exposure varied. The condition for exposure optimal for a dynamic range needed to image the photographic scene can be determined automatically in order to perform imaging. Eventually, an image obtainable with a dynamic range needed to photograph the photographic scene can be produced in order to reproduce the photographic scene. In particular, when exposure is performed a plurality of times with the condition for exposure varied, even if photographing a photographic scene requires a wide dynamic range, the photographic scene can be imaged optimally. Eventually, an image obtainable with the wide dynamic range can be substantially produced in order to reproduce the photographic scene.

Figure 17:
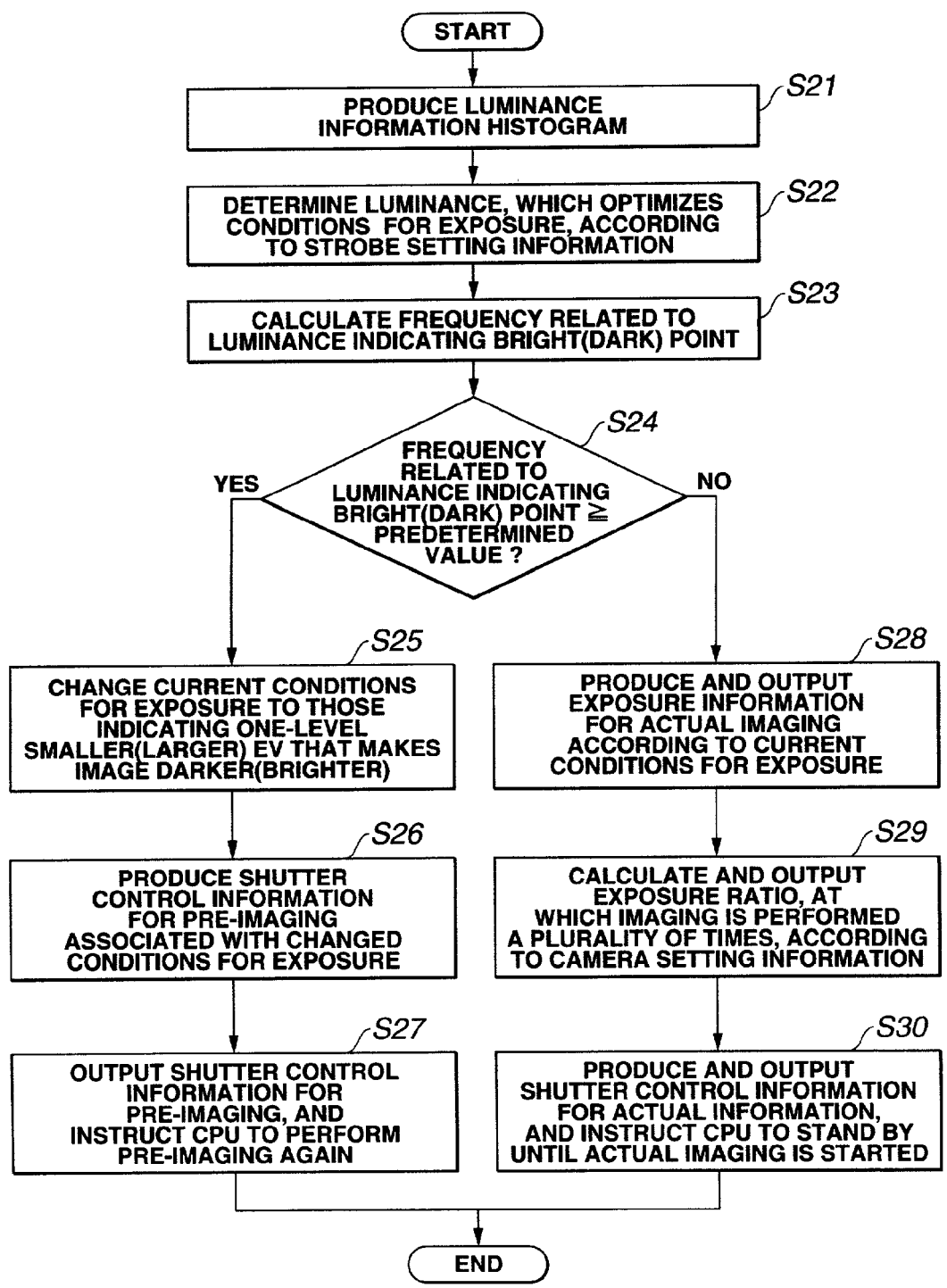
FIG. 17 is a flowchart describing processing to be performed by the shutter control information circuit employed in the fourth embodiment.
Figure 19A:
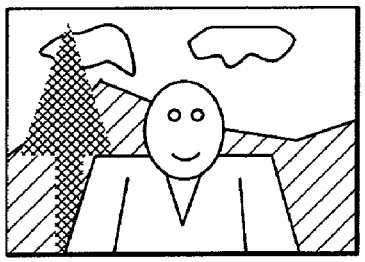
FIG. 19A, FIG. 19B, and FIG. 19C show a scene that consists of objects which have a difference in luminance and that is exposed a plurality of times with an exposure level varied.
Figure 19B:
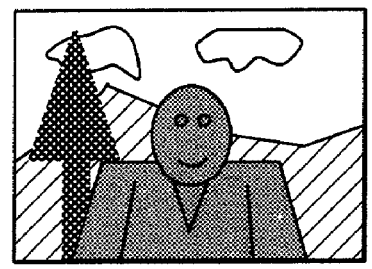
Figure 19C:
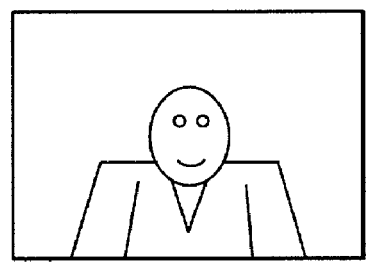

FIG. 16 to FIG. 18 show a fourth embodiment of the present invention. FIG. 16 is a block diagram showing the configuration of a shutter control information circuit 60. In the fourth embodiment, the names and reference numerals assigned to the components of the third embodiment are employed if necessary. The description of the components identical to those of the third embodiment will be omitted, and differences alone will be described mainly.

The fourth embodiment is, similarly to the third embodiment, a digital still camera to which an image-pickup apparatus in accordance with the present invention is adapted. The configuration of the digital still camera is nearly identical to that shown in FIG. 12. However, the shutter control information circuit 60 is substituted for the shutter control information circuit 50.

In the digital still camera of the fourth embodiment, similarly to the aforesaid digital still cameras, the shutter is controlled on the assumption that when the wide dynamic range photographing mode is selected, exposure is performed twice with a condition for exposure varied.

In the configuration shown in FIG. 16, pre-photographing is performed in order to acquire luminance information concerning a photographic scene. The processing from the step at which the A/D converter 5 produces luminance information aa concerning the photographic scene to the step at which a scene information distribution calculating circuit 61 produces luminance distribution information bb is identical to the processing described in FIG. 13 implemented in the third embodiment. The scene information distribution calculating circuit 61 has the same configuration as the scene information distribution calculating circuit 51 and serves as an information acquiring means.

Thereafter, a scene information analyzing circuit 62 that is an analyzing means receives the luminance distribution information (histogram) bb from the scene information distribution calculating circuit 61, and receives strobe setting information mm from the CPU 8. The scene information analyzing circuit 62 then analyzes the histogram. Specifically, according to the fourth embodiment, the strobe setting information mm is acquired in order to estimate within what range the brightness of a major object falls. The subsequent processing is performed so that the major object will be exposed properly. If the major object exists at a bright point, a condition for exposure is determined relative to imaging of the bright point alone. If the major object exists at a dark point, the condition for exposure is determined relative to imaging of the dark point alone. At this time, the condition for exposure is determined to realize proper exposure.

For example, if the strobe setting information mm signifies that the strobe is used, a photographic scene in which a figure poses while being backlit in the daytime or a figure poses at night is estimated. At this time, the luminance distribution information (histogram) bb produced under an initial condition for exposure is referenced.

Assume that the luminance distribution information (histogram) bb reveals that the frequency of a luminance level indicating a bright point (highlight) in the histogram is larger than a predetermined value. This means that the photographic scene contains many points equivalent to the highlight. The photographic scene is therefore thought to correspond to the photographic scene in which a figure poses while being backlit in the daytime. Since the strobe is used, a major object is estimated to lie at a relatively dark point. Consequently, the subsequent processing is performed in order to optimize a condition for exposure under which the dark point at which the major object lies is imaged.

Moreover, if the frequency of a luminance level indicating a bright point (highlight) in the histogram is equal to or smaller than a predetermined value, it is thought that the photographic scene does not contain many points equivalent to the highlight. The photographic scene is therefore regarded to correspond to the photographic scene in which a figure poses at night. The strobe is therefore used to image the photographic scene, and the major object is estimated to lie at a relatively bright point. Consequently, the subsequent processing is performed in order to optimize the condition for exposure relative to the bright point under which the main object lies.

In contrast, if the strobe setting information mm signifies that the strobe is unused, the subsequent processing is performed in order to optimize the condition for exposure under which the dark point is imaged.

The scene information analyzing circuit 62 calculates the frequency of the luminance level indicating the bright or dark point, and transmits the result of the analysis as luminance analysis information nn.

A conditions-for-exposure judging circuit 63 that serves as a conditions-for-photographing setting means and a control means receives the luminance analysis information nn, and then acts similarly to the conditions-for-exposure judging circuit 53 employed in the third embodiment.

If the result of judgment made to see if the condition for exposure is appropriate is "change of a condition for exposure", the conditions-for-exposure judging circuit 63 transmits changed exposure information pp as the condition for exposure to be changed. A conditions-for-exposure changing circuit 64 that serves as a conditions-for-photographing setting means and a control means receives the changed exposure information pp and acts similarly to the conditions-for-exposure changing circuit 54 employed in the third embodiment. The conditions-for-exposure changing circuit 64 then transmits pre-photographing shutter control information qq that is produced in compliance with the changed condition for exposure.

In contrast, if the result of judgment made to see if the condition for exposure is appropriate is "determination of a condition for exposure", the conditions-for-exposure judging circuit 63 transmits actual photographing exposure information oo as the condition for exposure that is one of the conditions for actual photographing to an exposure ratio adjusting circuit 65 and a shutter control information-for-actual photographing producing circuit 66 that will be described later.

The exposure ratio adjusting circuit 65 that serves as a conditions-for-photographing setting means and an adjusting means receives the actual photographing exposure information oo and camera setting information rr that includes photometric area information and strobe information sent from the CPU 8. The exposure ratio adjusting circuit 65 then calculates an exposure ratio at which imaging is performed twice with an exposure level varied.

Herein, the actual photographing exposure information oo is information representing a condition for exposure optimal to a major object. Unlike the aforesaid third embodiment, the actual photographing exposure information oo represents the condition for exposure under which exposure is performed only once. The exposure ratio adjusting circuit 65 therefore calculates an exposure ratio to the actual photographing exposure information oo and transmits the exposure ratio as exposure ratio information ss. The exposure ratio is the ratio of a condition for exposure, under which an object other than the major object is photographed.

The shutter control information-for-actual photographing producing circuit 66 that is a conditions-for-photographing setting means receives the actual photographing exposure information oo and exposure ratio information ss, and produces shutter control information needed to perform actual photographing during which exposure is performed twice with an exposure level varied. The shutter control information-for-actual photographing producing circuit 66 then transmits the shutter control information as actual photographing shutter control information tt.

A shutter control information selection switch 67 switches contacts thereof in response to control information ii sent from the CPU 8, and transmits the pre-photographing shutter control information qq or actual photographing shutter control information tt as shutter control information kk.

The CPU 8 judges, similarly to the CPU included in the third embodiment, from the result of checking of the exposure optimization information dd whether pre-photographing should be performed again or a standby state should be retained until actual photographing is started.

FIG. 17 is a flowchart describing processing to be performed by the shutter control information circuit 60. Some steps described in FIG. 17 are identical to those described in FIG. 14. The reiteration of the steps will therefore be omitted.

Step S21 is identical to step S11 in FIG. 14.

Thereafter, based on the strobe setting information mm, a luminance level contained in a luminance histogram produced at step S21 is determined in order to optimize a condition for exposure under which a point indicated by the luminance level is photographed (step S22). Herein, either a bright point or a dark point is selected in order to optimize the condition for exposure under which the point is photographed.

The subsequent step S23 and step S24 are identical to step S12 and step S13 in FIG. 14.

Step S25, step S26, and step S27 are identical to step S14, step S15, and step S16 in FIG. 14. Herein, control is passed successively to the steps S25, S26, and S27 when it is judged at step S24 that the frequency of the luminance level indicating a bright (dark) point is equal to or larger than a predetermined value (change of a condition for exposure).

Moreover, if it is judged at step S24 that the frequency of the luminance level indicating the bright (dark) point is smaller than the predetermined value (determination of a condition for exposure), the actual photographing exposure information oo is produced based on a current condition for exposure, and then transmitted (step S28).

Thereafter, the camera setting information rr is used to calculate an exposure ratio at which exposure is performed a plurality of times with an exposure level varied (step S29).

Herein, the camera setting information rr and actual photographing exposure information oo are referenced in order to calculate a ratio of photographing exposure information to the actual photographing exposure information oo. Herein, the actual photographing exposure information oo represents a condition for exposure under which a major object is exposed properly, and the photographing exposure information represents a condition for exposure under which an object other then the major object is photographed. The calculated ratio is transmitted as the exposure ratio information ss.

Thereafter, the actual photographing shutter control information tt is produced based on the actual photographing exposure information oo and exposure ratio information ss, and then transmitted. The CPU 8 is thus informed of the fact that the standby state is retained until actual photographing is started (step S30).

When step S27 or step S30 is completed, the processing is terminated.

The processing flow described in FIG. 17 and implemented in the fourth embodiment is basically identical to the processing flow described in FIG. 14 and implemented in the third embodiment. When a histogram produced under an initial condition for exposure is analyzed (step S23), only the frequency of a luminance level indicating either a bright point or a dark point is checked. Even when pre-photographing must be performed again thereafter, it is unnecessary to check both the frequencies of luminance levels indicating the bright point and dark point. This is a difference from the third embodiment.

Moreover, after the condition for exposure is changed, pre-photographing is performed. Thereafter, according to the processing flow described in FIG. 17, since it is already determined whichever of the bright point and dark point should be exposed properly, step S22 need not be performed. Therefore, a flag indicating whether a condition for exposure has been changed may be set. If the flag is set, step S22 may be skipped.

FIG. 18 shows an example of a lookup table which the exposure ratio adjusting circuit 65 references to retrieve exposure ratio information ss.

In order to produce exposure ratio information ss by referencing the lookup table shown in FIG. 18, an exposure time required to properly expose a major object is adopted as the actual photographing exposure information oo, and a photometry level is adopted as the camera setting information rr. Moreover, an f-number and the strobe setting information mm are utilized. Herein, as far as the digital still camera of the present embodiment is concerned, the exposure time can be set to a value ranging from $1/8000$ sec to $1/4$ sec, and the f-number can be set to a value ranging from 2.8 to 11.0.

The exposure ratio information ss shown in FIG. 18 is a ratio of an exposure time, which is required to expose an object other than a major object, to an exposure time (required to expose the major object) represented by the actual photographing exposure information oo. The exposure time required to expose an object other than the major object is calculated by multiplying the actual photographing exposure information oo by the ratio.

Moreover, the ratio varies depending on whether the actual photographing exposure information oo is concerned with a bright point or a dark point.

For example, if the actual photographing exposure information oo is information concerning the bright point, what must be produced is exposure information concerning the dark point. An exposure time required to expose the dark point is longer than the exposure time required to expose the bright point. Therefore, the exposure ratio, that is, the ratio of the exposure times assumes a value equal to or larger than 1.

In contrast, when the actual photographing exposure information oo is information concerning the dark point, what must be produced is exposure information concerning the bright point. An exposure time required to expose the bright point is shorter than the exposure time required to expose the dark point. Therefore, the exposure ratio, that is, the ratio of the exposure times assumes a value equal to or smaller than 1.

The bright point and dark point are entered as sub-items of item Major Object written on the first row of the table shown in FIG. 18. When the actual photographing exposure information oo is concerned with the bright point, a calculated exposure ratio is entered in association with item Bright Point. When the actual photographing exposure information oo is concerned with the dark point, a calculated exposure ratio is entered in association with item Dark Point. However, as mentioned above, a range of exposure times to which the digital still camera can be set is limited. The exposure ratio therefore assume values permitting realization of an exposure time that falls within the range.

Next, a description will be made of items contained in the camera setting information rr and employed in the table shown in FIG. 18, and how to treat the items.

A photometry level is information concerning a dynamic range required to photograph a photographic scene, and detected in units of an area included in a plurality of areas into which an image field is divided. A difference between a maximum value of the photometry level and a minimum value thereof which are detected in each area is calculated, and the ratio of the difference to the largest value of the photometry level detected in the image field is calculated. An exposure ratio value is retrieved from the lookup table shown in FIG. 18 in association with the calculated ratio.

In the example shown in FIG. 18, the ratio of the difference to the largest value is classified into five ranges. Depending on whether the actual photographing exposure information oo is concerned with a bright point or a dark point, a unique exposure ratio value is retrieved from the table. Specifically, assuming that the ratio of the difference to the largest value falls within a range of 50% or more, the exposure ratio assumes a value of, for example, 16. That is to say, if the actual photographing exposure information oo is concerned with the bright point, the exposure ratio assumes a value of 16. If the actual photographing exposure information oo is concerned with the dark point, the exposure ratio assumes a value of 1/16. The same applies to any other value assumed by the ratio of the difference to the largest value. Namely, if the ratio of the difference to the largest value falls within a range from 25 to 50%, the exposure ratio assumes a value of 8. If the ratio of the difference to the largest value falls within a range from 10 to 25%, the exposure ratio assumes a value of 4. If the ratio of the difference to the largest value falls within a range from 5 to 10%, the exposure ratio assumes a value of 2. If the ratio of the difference to the largest value falls within a range less than 5%, the exposure ratio assumes a value of 1. If the ratio of the difference to the largest value is 1, an exposure time is equal to the exposure time represented by the actual photographing exposure information oo. Even in the wide dynamic range photographing mode, imaging is completed through one exposure.

The f-number is an f-number to which an image-pickup optical system including the lens 2 and diaphragm/shutter mechanism 3 is set. An exposure ratio value is retrieved from the lookup table shown in FIG. 18 in association with an f-number acquired from the image-pickup optical system.

In the example shown in FIG. 18, the exposure ratio is associated with the f-number according to the same means as the means adopted for the photometry level. Specifically, when the f-number assumes a value of 2.8, the exposure ratio assumes a value of, for example, 16. Likewise, if the f-number assumes a value of 4.0, the exposure ratio assumes a value of 8. If the f-number assumes a value of 5.6, the exposure ratio assumes a value of 4. If the f-number assumes a value of 8.0, the exposure ratio assumes a value of 2. If the f-number assumes a value of 11.0, the exposure ratio assumes a value of 1.

The strobe setting information mm is information indicating whether the strobe 19 is used or not. Based on the information, an exposure ratio value is retrieved from the lookup table shown in FIG. 18.

In the example shown in FIG. 18, when the strobe is used (item Used), the exposure assumes a value of, for example, 4. When the strobe is unused (item Not Used), the exposure ratio assumes a value of 8.

In addition, as shown in FIG. 18, the actual photographing exposure information oo may be used to retrieve an exposure ratio value.

In consideration of whether the actual photographing exposure information oo is concerned with a luminance level indicating a bright point or a dark point, an exposure ratio value is retrieved from the lookup table shown in FIG. 18.

In this example, when the actual photographing exposure information oo is information concerning the bright point (short-time exposure in the wide dynamic range photographing mode), the exposure ratio assumes a value of, for example, 4. When the actual photographing exposure information oo is information concerning the dark point (long-time exposure in the wide dynamic range photographing mode), the exposure ratio assumes a value of 8.

The description has been made on the assumption that various kinds of information can be utilized. In reality, an exposure ratio value may be retrieved in association with any one kind of information. Otherwise, exposure ratio values retrieved in association with all the kinds of information may be averaged. Otherwise, the exposure ratio values retrieved in association with all the kinds of information may be weighted with coefficients proportional to the degrees of importance of the kinds of information, and then averaged. Thus, an exposure ratio value may be calculated. Nevertheless, the present invention is not limited to these means but can be applied to any other various means.

According to the fourth embodiment, prior to actual photographing, information concerning a dynamic range required to photograph a photographic scene is acquired and analyzed. The conditions for actual photographing are determined based on the result of the analysis. Photographing is then achieved by performing one exposure or by performing a plurality of exposures with a condition for exposure varied. The fourth embodiment can therefore provide the same advantages as the third embodiment. In particular, when photographing is achieved by performing a plurality of exposures with the condition for exposure varied, the exposure ratio is adjusted. Therefore, even when a photographic scene requires a wide dynamic range, the photographic scene can be photographed optimally. Namely, an image obtainable with a wide dynamic range can be produced in order to reproduce the photographic scene.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image-pickup apparatus comprising:
   an information acquiring means for, prior to actual photographing, acquiring information concerning a dynamic range, which is required to photograph a photographic scene, with a first condition for exposure and a second condition for exposure different from the first condition for exposure;
   an analyzing means for analyzing the information acquired by said information acquiring means, including an information synthesizing means for synthesizing the information concerning a dynamic range with said first and second conditions for exposure acquired by said information acquiring means, wherein the information synthesizing means synthesizes at least first and second luminance information obtained during the first condition for exposure and the second condition for exposure, respectively, wherein the first and second luminance information are matched with a corresponding exposure level associated with the first condition for exposure and the second condition for exposure, respectively, to provide synthetic luminance information based on the first and second luminance information and a histogram arithmetic means for producing a histogram of the information synthesized by said information synthesizing means including the synthetic luminance information;
   a conditions-for-photographing setting means for setting the conditions for actual photographing according to the result of the analysis performed by said analyzing means;
   a photographing means for performing actual photographing under the conditions for actual photographing set by said conditions-for-photographing setting means, and
   an image information converting means for converting an image produced during the actual photographing according to the result of analysis performed by said analyzing means.

2. The image-pickup apparatus according to claim 1, wherein said analyzing means further includes:

a gray scale arithmetic means for producing a gray scale conversion characteristic curve using a histogram, which represents the distribution of frequencies that are equal to or larger than a predetermined value among the values of frequencies contained in the histogram produced by said histogram arithmetic means.

3. The image-pickup apparatus according to claim 1, wherein the information concerning a dynamic range acquired by said information acquiring means is luminance information concerning a photographic scene.

4. The image-pickup apparatus according to claim 1, wherein the conditions for actual photographing set by said conditions-for-photographing setting means are information needed to drive a shutter.

5. The image-pickup apparatus according to claim 1, wherein said photographing means includes a flashlight emitting means that irradiates light to a photographic scene, and said flashlight emitting means is controlled based on the conditions for actual photographing set by said conditions-for-photographing setting means.

6. The image-pickup apparatus according to claim 1, wherein the conditions for actual photographing set by said conditions-for-photographing setting means are information concerning a plurality of exposure levels that signifies different exposures.

7. The image-pickup apparatus according to claim 1, wherein said photographing means performs actual photographing during which exposure is performed a plurality of times under the conditions for actual photographing with a condition for exposure, which is included in the conditions for actual photographing, varied.

8. The image-pickup apparatus according to claim 1, wherein:

said conditions-for-photographing setting means includes a control means that judges from the result of analysis performed by said analyzing means whether a condition for exposure under which said information acquiring means acquires information is appropriate; and if said control means judges that the condition for exposure is inappropriate, said control means changes the condition for exposure and instructs said information acquiring means to acquire information again.

9. The image-pickup apparatus according to claim 8, wherein when said control means changes a condition for exposure that is judged to be inappropriate from the result of analysis performed by said analyzing means, said control means changes the condition for exposure to either or both of a condition for exposure making an image darker and a condition for exposure making an image brighter.

10. The image-pickup apparatus according to claim 1, wherein said conditions-for-photographing setting means includes an adjusting means that adjusts the conditions for actual photographing set based on the result of analysis performed by said analyzing means.

11. The image-pickup apparatus according to claim 10, wherein said adjusting means adjusts the conditions for actual photographing, which are set based on the result of analysis performed by said analyzing means, according to a dynamic range required to photograph a photographic scene.

12. The image-pickup apparatus according to claim 10, wherein said adjusting means checks the conditions for actual photographing set based on the result of analysis performed by said analyzing means, and adjusts the conditions for actual photographing if adjustment is judged to be necessary.

13. The image-pickup apparatus according to claim 12, wherein the conditions for actual photographing to be checked by said adjusting means include at least one of information concerning an exposure level and information of an f-number.

14. The image-pickup apparatus according to claim 10, wherein said photographing means includes a flashlight emitting means that irradiates light to a photographic scene, and said adjusting means adjusts the conditions for actual photographing according to the use situation of said flashlight emitting means.

15. The image-pickup apparatus according to claim 1, wherein said conditions-for-photographing setting means includes an adjusting means that adjusts the ratio of different conditions for exposure which signify a plurality of exposures and which are included in the conditions for actual photographing set based on the result of analysis performed by said analyzing means.

16. The image-pickup apparatus according to claim 15, wherein said adjusting means adjusts the conditions for actual photographing, which are set based on the result of analysis performed by said analyzing means, according to a dynamic range required to photograph a photographic scene.

17. The image-pickup apparatus according to claim 15, wherein said adjusting means checks the conditions for actual photographing set based on the result of analysis performed by said analyzing means, and adjusts the conditions for actual photographing if adjustment is judged to be necessary.

18. The image-pickup apparatus according to claim 17, wherein the conditions for actual photographing to be checked by said adjusting means include at least one of information concerning an exposure level and information of an f-number.

19. The image-pickup apparatus according to claim 15, wherein said photographing means includes a flashlight emitting means that irradiates light to a photographic scene, and said adjusting means adjusts the conditions for actual photographing according to the use situation of said flashlight emitting means.

* * * * *